(12) United States Patent
Kras

(10) Patent No.: US 11,418,541 B2
(45) Date of Patent: *Aug. 16, 2022

(54) SYSTEMS AND METHODS FOR SIMULATED PHISHING ATTACKS INVOLVING MESSAGE THREADS

(71) Applicant: KnowBe4, Inc., Clearwater, FL (US)

(72) Inventor: Greg Kras, Dunedin, FL (US)

(73) Assignee: KnowBe4, Inc., Clearwater, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/399,739

(22) Filed: Aug. 11, 2021

(65) Prior Publication Data

US 2021/0377305 A1  Dec. 2, 2021

Related U.S. Application Data

(63) Continuation of application No. 16/993,958, filed on Aug. 14, 2020, now Pat. No. 11,108,822.

(60) Provisional application No. 62/898,145, filed on Sep. 10, 2019.

(51) Int. Cl.
| | |
|---|---|
| *H04L 9/40* | (2022.01) |
| *H04L 51/08* | (2022.01) |
| *H04L 67/306* | (2022.01) |
| *H04L 51/42* | (2022.01) |
| *H04L 51/212* | (2022.01) |
| *H04L 51/216* | (2022.01) |

(52) U.S. Cl.
CPC ......... *H04L 63/1483* (2013.01); *H04L 51/08* (2013.01); *H04L 51/212* (2022.05); *H04L 51/216* (2022.05); *H04L 51/42* (2022.05); *H04L 63/1416* (2013.01); *H04L 63/1433* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,615,807 B1 * | 12/2013 | Higbee | ................. G06F 21/577 726/25 |
| 8,635,703 B1 | 1/2014 | Belani et al. | |
| 8,719,940 B1 | 5/2014 | Higbee et al. | |

(Continued)

FOREIGN PATENT DOCUMENTS

| | | |
|---|---|---|
| EP | 3 582 468 | 12/2019 |
| WO | WO-2016/164844 A1 | 10/2016 |

OTHER PUBLICATIONS

U.S. Notice of Allowance on U.S. Appl. No. 16/993,958 dated Jun. 16, 2021.

(Continued)

*Primary Examiner* — Kaveh Abrishamkar
(74) *Attorney, Agent, or Firm* — Foley & Lardner LLP

(57) ABSTRACT

Systems and methods are disclosed for simulating a phishing attack involving an email thread. An email thread of a plurality of email threads of an entity for use in a simulated phishing attack is identified. A simulation system generates a converted reply simulated phishing email to an email of the email thread. The converted reply simulated phishing email is generated to be from a user that is one of a recipient or a sender of one or more emails of the email thread and is communicated to a target user's email account, the converted reply simulated phishing email.

20 Claims, 11 Drawing Sheets

(56) References Cited

U.S. PATENT DOCUMENTS

| | | |
|---|---|---|
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,781,160 B1 * | 10/2017 | Irimie .................. H04L 63/1491 |
| 9,876,753 B1 | 1/2018 | Hawthorn |
| 9,912,687 B1 | 3/2018 | Wescoe et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,108,822 B2 * | 8/2021 | Kras ....................... H04L 51/16 |
| 11,184,393 B1 | 11/2021 | Gendre et al. |
| 2016/0164898 A1 | 6/2016 | Belani et al. |
| 2016/0301705 A1 | 10/2016 | Higbee et al. |
| 2019/0005428 A1 * | 1/2019 | Kras ..................... H04L 63/1483 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |

OTHER PUBLICATIONS

Catalin Cimpanu "Emotet Hijacks email conversation threads to insert links to malware," pp. 1-5, Apr. 11, 2019, (Year:2019).

Kelvin Murray, "Hijacked Email Reply Chains'" Apr. 3, 2019, (Year: 2019).

Non-Final Office Action on U.S. Appl. No. 16/993,958 dated Nov. 17, 2020.

U.S. Office Action on U.S. Appl. No. 16/993,958 dated Feb. 25, 2021.

* cited by examiner

SYSTEMS AND METHODS FOR SIMULATED PHISHING ATTACKS INVOLVING MESSAGE THREADS

This patent application is a continuation of, and claims priority to and the benefit of U.S. patent application Ser. No. 16/993,958, titled "SYSTEMS AND METHODS FOR SIMULATED PHISHING ATTACKS INVOLVING MESSAGE THREADS," and filed Aug. 14, 2020, which claims the benefit of and priority to U.S. Provisional Patent Application No. 62/898,145 titled "SYSTEMS AND METHODS FOR SIMULATED PHISHING ATTACKS INVOLVING MESSAGE THREADS," and filed Sep. 10, 2019, the contents of all of which are hereby incorporated herein by reference in its entirety for all purposes This disclosure generally relates to systems and methods for simulating a phishing attack involving message threads.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage are increasing every year.

Phishing attacks are cyber security threats that exploit human behavior to gain access to organizational systems and personal information of users. The attacks utilize a message sent to a user, where the message has content that convinces the receiver of the attack that the message is genuine and that they should act upon it. The more genuine the message appears to be, the higher the likelihood the user will respond to it. Furthermore, compromising a user's account as a "trusted person" is an increasingly common attack vector. To this end, the threats incorporate content that the user will recognize as genuine, personal, or believable.

Simulated phishing attacks are used to teach users to recognize real phishing attacks, so that they will not fall prey to actual attacks and jeopardize the security of an associated entity. These simulated attacks include tricks that real phishing emails use, to try and teach the user to recognize these. As with real threats, the more genuine looking a simulated attack is, the more likely a user will respond to it, which provides an opportunity for the simulated phishing attack system to train the user to recognize very sophisticated attack vectors.

BRIEF SUMMARY OF THE DISCLOSURE

In embodiments, a simulated phishing attack involves identifying a message thread of an entity for use in a simulated phishing attack for users of the entity. A message thread has two or more users of the entity participating on the message thread (i.e., that are either a recipient or a sender of one or more emails on the message thread) and consists of at least two related messages, for example a first message and a second message that is a reply to the first message. In examples, the message thread is identified based on thread selection parameters, such as attributes of the entity, attributes of one or more users participating in the message thread, and/or the subject matter of the message thread.

A simulation system generates a converted reply simulated phishing email to one of the emails of the message thread and communicates the converted reply simulated phishing email to the email account of a user (the target user). In embodiments, the converted reply simulated phishing email is generated to be sent from a user that is a participant in the message thread, that is the user is either a sender or a recipient on the message thread (in any address field for the message thread, for example to: cc: bcc: or from) or it may be generated to appear to be from a user that is a participant in the message thread. In examples, the simulation system accesses the user's email account to identify the message thread. In embodiments, the message thread is forwarded, transferred or copied to the simulation system by the entity's mail server or by an administrator of the entity.

The simulation system may access the user's email account in order to generate the converted reply simulated phishing email from the user's email account. In examples, the simulation system may generate the converted reply simulated phishing email from within the user's email account, and/or may generate the converted reply simulated phishing email to appear as though it is being communicated from the user's account. In some examples, the simulation system generates the converted reply simulated phishing email as a reply to the first email of the message thread, to the last email of the message thread, or to any intermediary email of the message thread.

The converted reply simulated phishing email generated by the simulation system may prompt the target user to interact with the email, for example to click a link or open an attachment, and this interaction may be identified by the simulation system. The simulation system may remove all recipients and senders of the message thread except the target user from generated converted reply simulated phishing email. The simulation system may mimic email addresses of all recipients and senders of the message thread except the target user when generating the converted reply simulated phishing email, such that the email addresses are not those of the recipients and senders of the message thread, however they may look similar and be mistaken for the actual email addresses of the recipients and senders of the message thread.

In examples, the simulation system may generate the converted reply simulated phishing email to display correct names but use incorrect email addresses for all recipients or senders of the message thread, except the target user. In embodiments, the incorrect email addresses are simulation server email addresses, e.g., when mail is sent to these addresses the mail is received by the simulation server. The mail server of the entity may use one or more rules or filters to intercept any replies and forwards of the converted reply simulated phishing email generated by the simulation system. The simulation system may identify if the target user replies to, or forwards, the converted reply simulated phishing email generated by the simulation system.

The simulation system may send selection parameters to the entity mail server to identify message threads, or the entity mail server may choose selection parameters to be used to identify message threads. The entity mail server may select a message thread in response to a request from the simulation server or the entity mail server may decide when to select a message thread. In some examples, the simulation system accesses the email account of a sender or a recipient of a message thread to identify the message thread. The identified message thread may be stored with other identified message threads at the entity mail server, or the identified message thread may be sent to the simulation server and stored with other identified message threads for that entity at the simulation server. In embodiments, the entity mail server forwards, transfers or copies stored identified message threads to the simulation system.

When a user identifies a received email as a potential threat and indicates this using a threat reporting mechanism, the email that the user reported as a potential threat emails may get sent to the simulation system. The simulation system can identify a message thread for a simulated phishing attack from a plurality of reported emails that are message threads and may store the identified message thread.

In some embodiments, the simulation system can have more than one of the participants of the message thread as target users for the converted reply simulated phishing email. The simulation system can add a user that was not a participant of the message thread to the converted reply simulated phishing message as a target user for the converted reply simulated phishing email. In some examples, the simulation system can add a target user by forwarding the converted reply simulated phishing message to a user that is not a participant on the message thread In embodiments, the simulation system moves users that are participants on the message thread but that are not a target user to the bcc: field of the converted reply simulated phishing email.

In embodiments, the entity mail server changes the REPLY TO: address for all recipients except the target user(s) of the converted reply simulated phishing email before sending the email. In examples, if a target user replies to or forwards the converted reply simulated phishing email, the SMTP manager at the entity mail server modifies the RCPT TO: field for one or more of the recipients of the reply or forwarded email, either removing the recipients or replacing the actual email address of the recipients with simulation server email addresses.

The simulation system may add an X-header to the converted reply simulated phishing message to indicate to the entity mail server that the converted reply simulated phishing message should only be delivered to the target user(s). The POP3/IMAP manager of the entity mail server can monitor for the added header in the converted reply simulated phishing message headers, and when finding messages with this header, the entity mail server would only deliver the message to the target user(s).

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for simulating a phishing attack involving message threads.

A. Computing and Network Environment

Figure 1A:
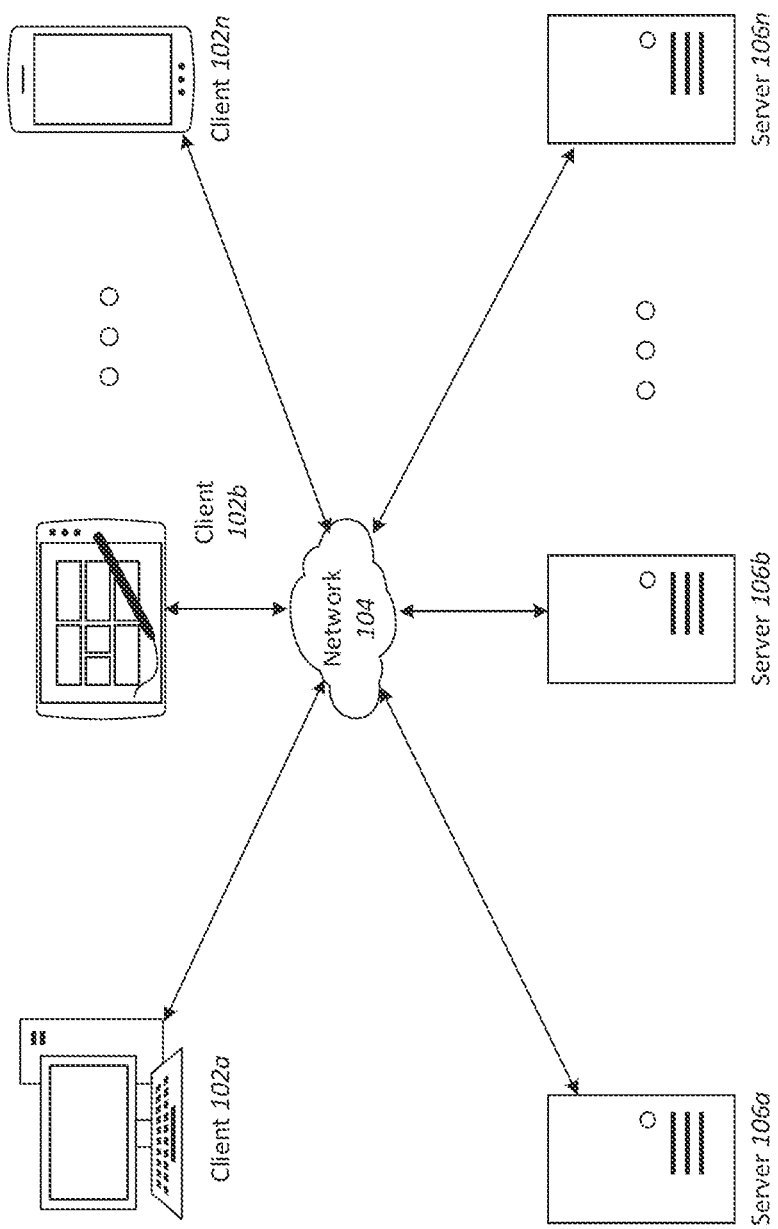
FIG. 1a is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1a, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, user(s) 102, user device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1a shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

Server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. Server 106 may include a processor and memory. Some or all of server 106 may be hosted on cloud 108, for example by Amazon Web Services (AWS, Amazon, Seattle, Wash.).

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
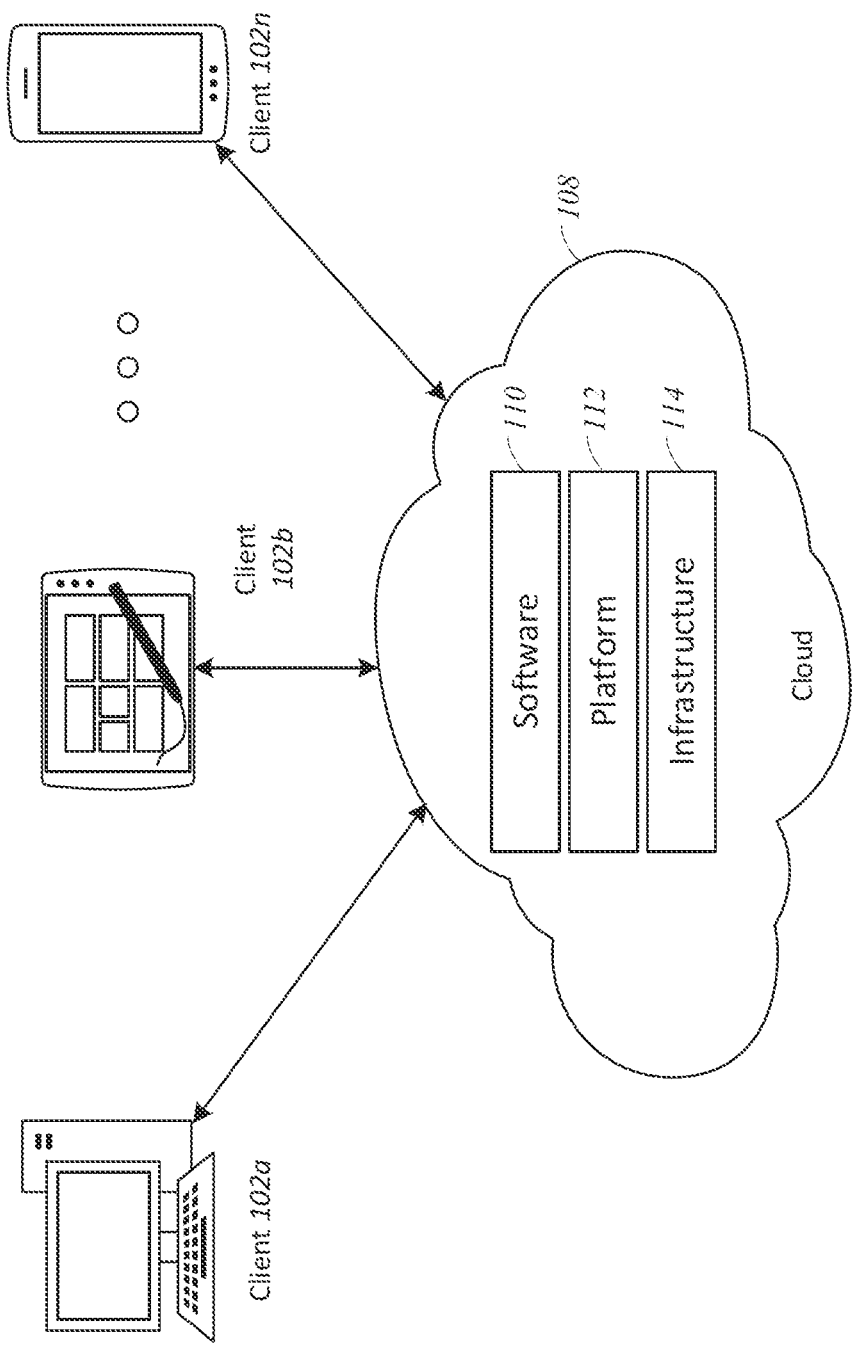
FIG. 1b is a block diagram depicting a cloud computing environment comprising client device in communication with cloud service providers.

Referring to FIG. 1b, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
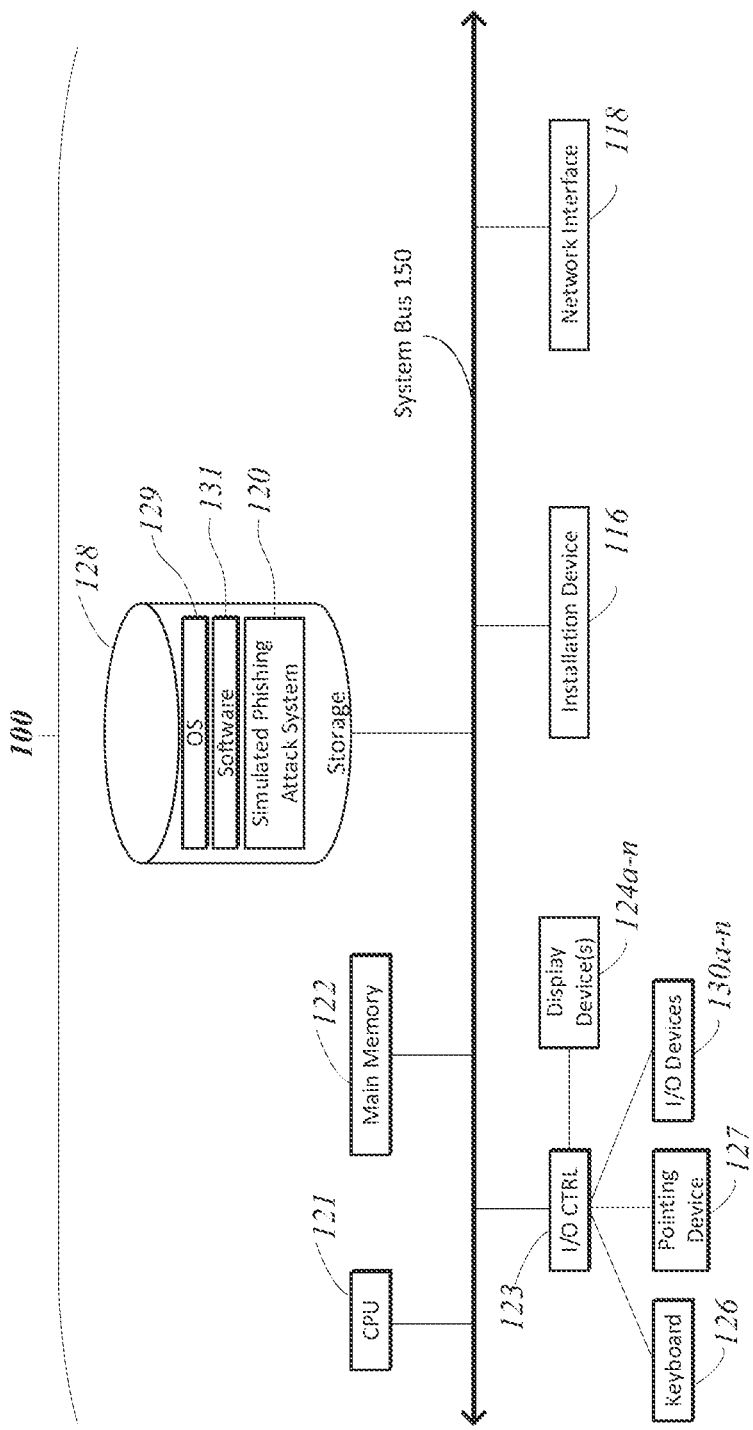
FIGS. 1c and 1d are block diagrams depicting embodiments of computing devices useful in connection with the methods and systems described herein.
Figure 1D:
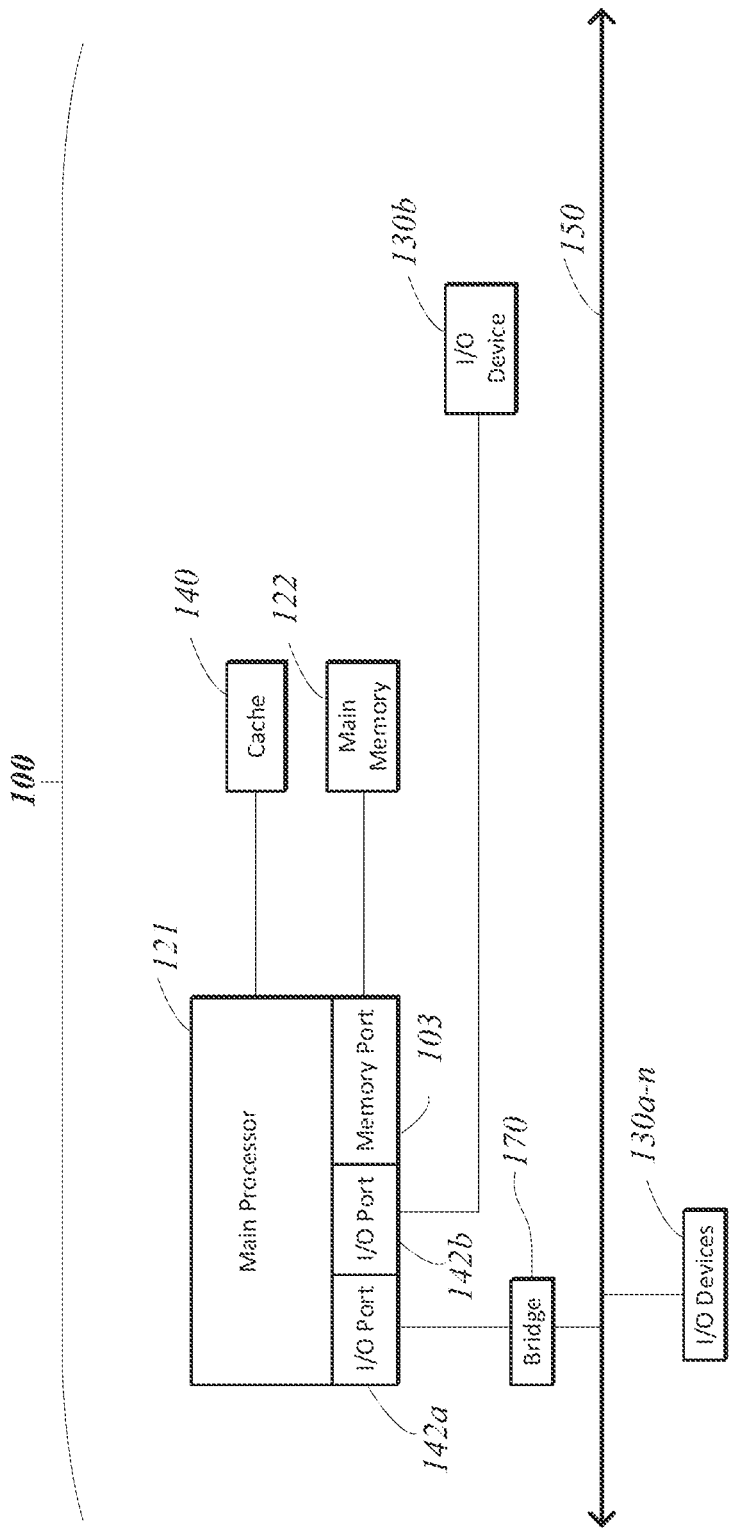

FIGS. 1c and 1d depict block diagrams of a computing device 100 useful for practicing an embodiment of client 102 or server 106. As shown in FIGS. 1c and 1d, each computing device 100 includes a central processing unit (CPU) 121, and a main memory unit 122. As shown in FIG. 1c, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1d, each computing device 100 may also include additional optional elements, e.g., a memory port 103, a bridge 170, one or more input/output devices 130a-130n (generally referred to using reference numeral 130), and a cache memory 140 in communication with the central processing unit (CPU) 121.

The CPU 121 is any logic circuity that responds to and processes instructions fetched from the main memory unit 122. In many embodiments, the CPU 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The CPU 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include one or more memory chips capable of storing data and allowing any storage location to be directly accessed by the CPU 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change RAM (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1c, CPU 121 communicates with main memory 122 via system bus 150 (described in more detail below). FIG. 1d depicts an embodiment of computing device 100 in which the processor communicates directly with main memory 122 via memory port 103. For example, in FIG. 1d main memory 122 may be DRDRAM.

FIG. 1d depicts an embodiment in which main processor or CPU 121 communicates directly with cache memory 140 via a secondary bus, sometimes referred to as a backside bus. In other embodiments, CPU 121 communicates with cache memory 140 using system bus 150. Cache memory 140 typically has a faster response time than main memory 122 and is typically provided by SRAM, BSRAM, or EDRAM. In the embodiment shown in FIG. 1d, CPU 121 communicates with various I/O devices 130 via a local system bus 150. Various buses may be used to connect the CPU 121 to any of I/O devices 130, including a PCI bus, a PCI-X bus, or a PCI-Express bus, or a NuBus. For embodiments in which the I/O device is a video display 124, CPU 121 may use an Advanced Graphic Port (AGP) to communicate with display 124 or the I/O controller 123 for display 124. FIG. 1d depicts an embodiment of a computer 100 in which the CPU 121 communicates directly with I/O device 130b or other CPUs 121' via HYPERTRANSPORT, RAPIDIO, or INFINIBAND communications technology. FIG. 1d also depicts an embodiment in which local busses and direct communication are mixed: the CPU 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1c. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form.

As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1c, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a 1/0 device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1b and 1c may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has enough processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Simulating a Phishing Attack Involving Message Threads The following describes systems and methods for simulating a phishing attack involving message threads.

Figure 2A:
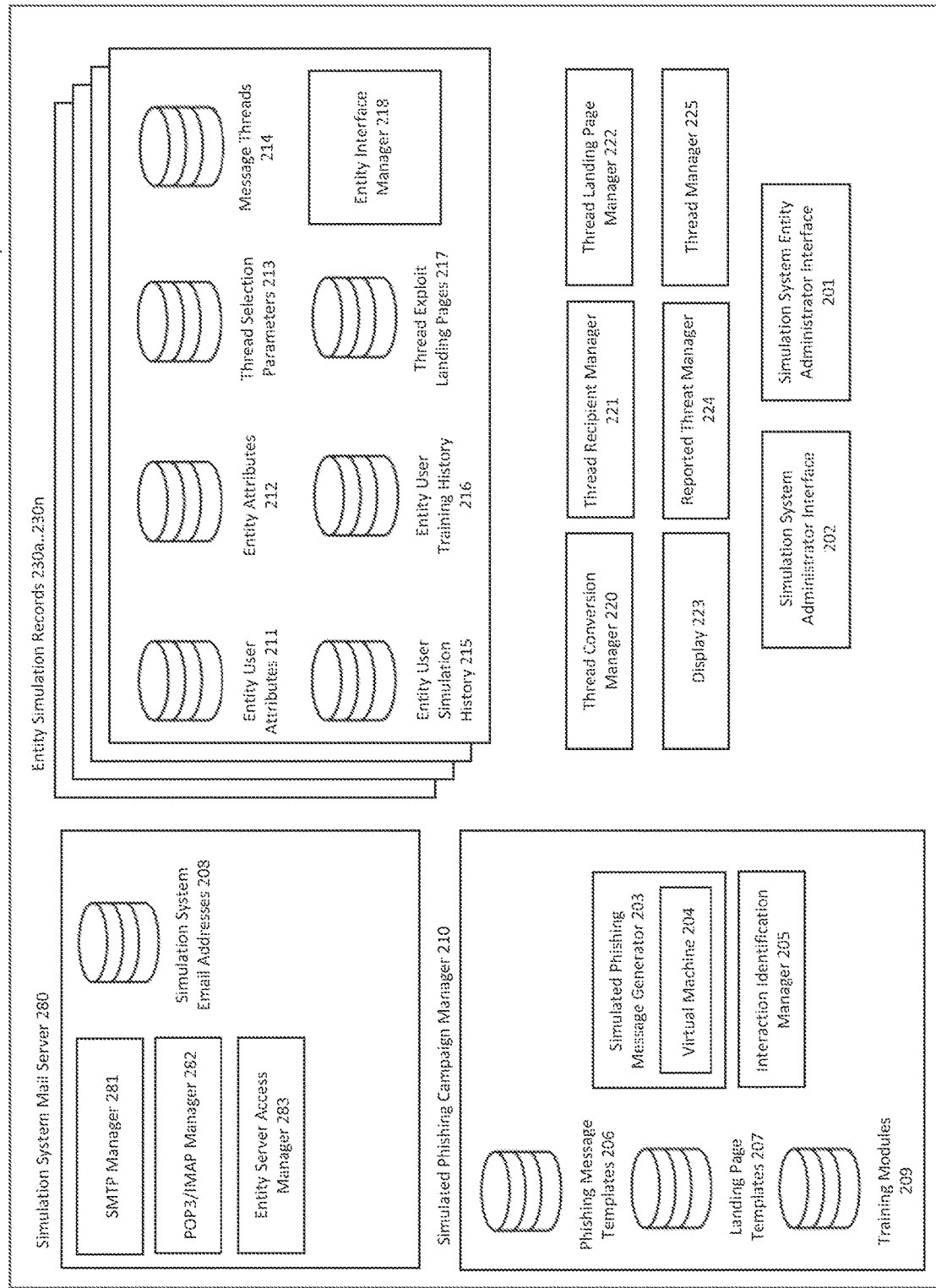
FIG. 2a depicts an example of an implementation of a simulation system server useful for simulating a phishing attack involving message threads.

Referring to FIG. 2a in a general overview, FIG. 2a depicts some of the architecture of an implementation of a simulation system 200 capable of carrying out a simulated phishing attack campaign, including simulating a phishing attack involving a message thread between two or more participants.

In some implementations, simulation system 200 may include one or more servers 106, which may include simulated phishing campaign manager 210. Simulated phishing campaign manager 210 may include simulated phishing message generator 203, which may include virtual machine 204. In embodiments, virtual machine 204 may include simulated phishing message generator 203. In embodiments, simulated phishing message generator 203 is configured to communicate converted reply simulated phishing messages to a message thread to entity 101 over network 104. In examples, simulated phishing campaign manager 210 includes interaction identification manager 205, which may be configured to identify interactions of users of entity 101 with simulated phishing attacks. Simulated phishing campaign manager 210 may include phishing message templates storage 206 which may be used to store one or more phishing message templates, and/or landing page templates storage 207, which may be used to store one or more landing page templates. Phishing message templates storage 206 and landing page templates storage 207 may include, be, integrate with or couple to any type or form of storage, such as a database or file system coupled to memory 122. Simulated phishing campaign manager 210 may comprise one or a combination of programs, services, tasks, scripts, libraries, applications or any type and form of executable instructions or code executable on one or more processors.

In examples, simulation system 200 may include simulation system mail server 280. In some embodiments, simulation system mail server 280 includes SMTP manager 281 and POP3/IMAP manager 282, which may be configured to send and receive email messages on behalf of simulation system 200. Simulation system mail server 280 may also include simulation system email addresses storage 208, comprising one or more email addresses which are associated with simulation system 200. SMTP manager 281 and POP3/IMAP manager 282 may comprise one or a combination of programs, services, tasks, scripts, libraries, applications or any type and form of executable instructions or code executable on one or more processors.

Simulation system 200 may include one or more entity simulation records 230, for example one entity simulation record for each unique entity. Entity simulation record 230 may include multiple storages for entity specific information, for example entity user attributes storage 211, entity attributes storage 212, thread selection parameters storage 213, message threads storage 214, entity user simulation history 215, entity user training history 216, and thread exploit landing pages storage 217. Entity simulation record 230 may include entity interface manager 218, which in examples is configured to enable simulated phishing campaign manager 210, thread manager 225, and thread conversion manager 220, and other aspects of simulation system 200 to access one or more entity simulation records 230. Simulation system email addresses storage 208, entity user attributes storage 211, entity attributes storage 212, thread selection parameters storage 213, and message threads storage 214, entity user simulation history storage 215, entity user training history storage 216, thread selection parameters storage 213, message threads storage 214, and thread exploit landing pages storage 217 may include, be, integrate with or couple to any type or form of storage, such as a database or file system coupled to memory 122.

Simulation system 200 may include simulation system entity administrator interface 201, configured to enable an administrator of entity 101 to interact with simulation system 200. Simulation system 200 may include simulation system administrator interface 202, configured to enable an administrator or other individual associated with a security awareness provider to interact with simulation system 200. In examples, simulation system administrator interface 202 and simulation system entity administrator interface 201 enable configuration of a simulated phishing attack campaign, for example using display 223.

Simulation system 200 may include thread manager 225, thread conversion manager 220, thread recipient manager 221, thread landing page manager 222, reported threat manager 224, and entity interface manager 218, each of which may comprise one or a combination of programs, services, tasks, scripts, libraries, applications or any type and form of executable instructions or code executable on one or more processors.

Figure 2B:
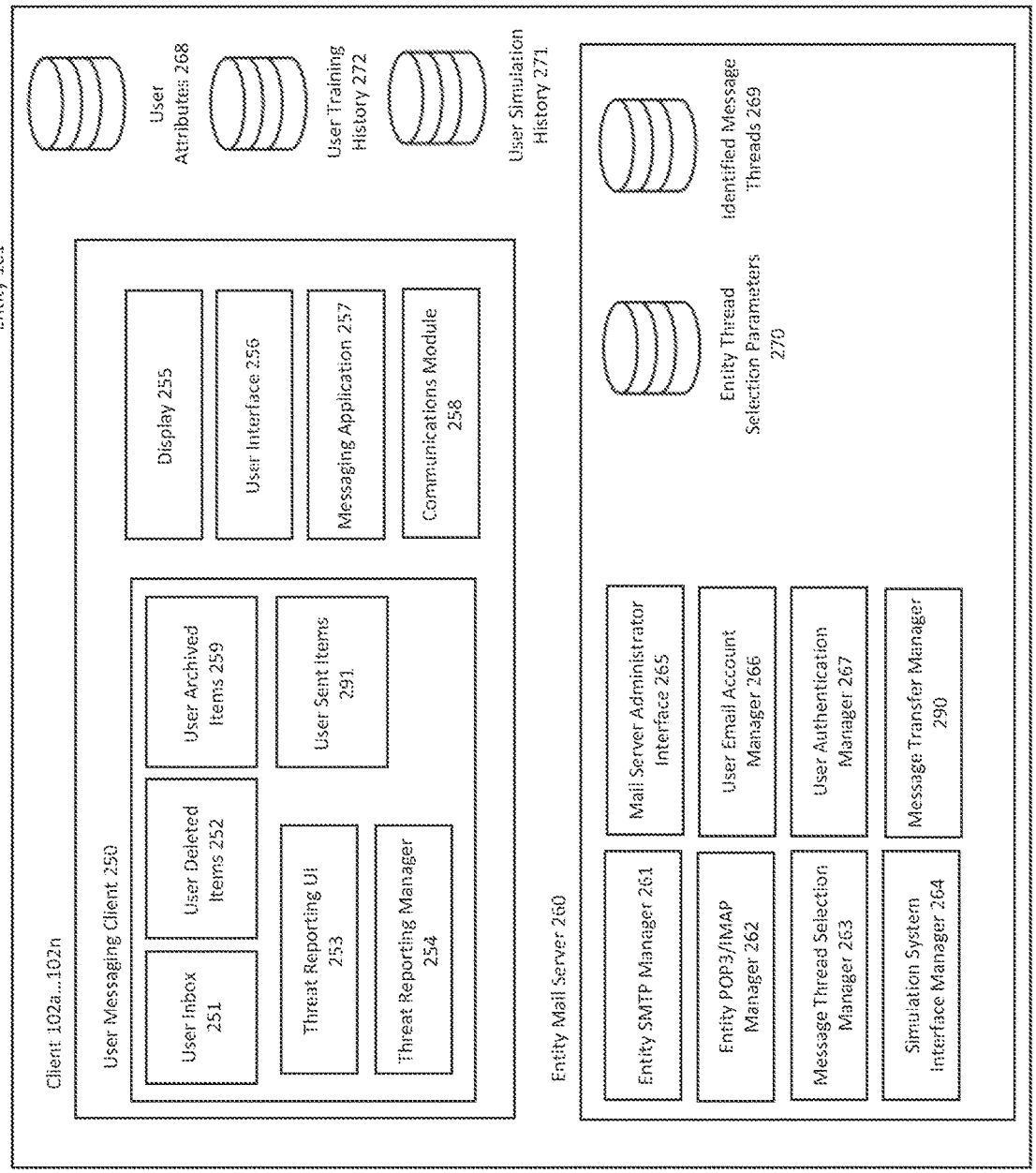
FIG. 2b depicts an example of an implementation of an entity system for receiving a simulated phishing attack involving message threads.

Referring to FIG. 2b in a general overview, entity 101 may comprise one or more clients 102a . . . 102n, each of which may include user messaging client 250. User messaging client 250 may comprise user inbox 251, user deleted items 252, thread reporting UI 253, and thread reporting manager 254. Client 102 may include display 255, user interface 256, messaging application 257, and communications module 258. In examples, entity 101 includes entity mail server 260. Entity mail server 260 may include entity SMTP manager 261 and entity POP3/IMAP manager 262, message thread selection manager 263 and user email account manager 266, and interfaces for configuration and operation, for example simulation system interface manager 264 and mail server administrator interface 265.

Entity mail server 260 may include multiple storages, for example user attributes storage 268, identified message threads storage 269, and entity thread selection parameters storage 270. Entity 101 may include user simulation history storage 271, and user training history storage 272.

Referring to FIG. 2a and FIG. 2b (collectively FIG. 2) in more detail, FIG. 2 includes simulation system 200. In some implementations, simulation system 200 may comprise one or more servers, represented as server 106. Simulation system 200 may provide access as needed to various applications, modules, and other software components of server 106 from other various applications, modules, and other software components of server 106. Simulated phishing campaign manager 210 may be referred to as a platform, a simulated attack platform, a simulation server, or a simulation platform.

Simulated phishing campaign manager 210 may be configured to monitor and control timing of various aspects of a simulated attack to process requests for access to simulated phishing attack results, or to perform other tasks related to the management and configuration of a simulated attack. Simulated phishing message generator 203 may be configurable to insert links, attachments, links within attachments, or links to files of any kind into a simulated phishing message. Messages generated by simulated phishing message generator 203 may be of any appropriate format. For example, they may be email messages, messages used by messaging applications such as, e.g., WhatsApp™ (Facebook, Inc., Menlo Park, Calif.), or any other type of message that may use digital user addresses. Simulated phishing message generator 203 may be configured to generate simulated phishing messages in any appropriate manner, e.g., by running an instance of an application that generates the desired message type, such as running e.g. a Gmail™ application (Google, Inc, Mountain View, Calif.), Microsoft Outlook™ (Microsoft Corp., Redmond, Wash.), WhatsApp™ (Facebook, Inc., Menlo Park, Calif.), a text messaging application, or any other appropriate application.

In embodiments, simulated phishing message generator 203 is configurable to insert links into simulated phishing messages that are associated with a landing page to traverse a target user to, if the target user interacts with the links in the simulated phishing message. Landing pages may be configured to provide training modules from training modules storage 209 to a target user that fails a simulated phishing test. In some implementations, training modules are associated with a landing page by an administrator, for example using simulation system administrator interface 202 or simulation system entity administrator interface 201. In some implementations, training modules are associated with a landing page by simulation system 200.

In examples, simulated phishing campaign manager 210 includes interaction identification manager 205, which is configured to identify interactions of users 102 of entity 101 with simulated phishing messages. In embodiments, interaction identification manager 205 is configured to record user interactions with simulated phishing messages, for example when a user clicks or hovers over a link in a simulated phishing message, downloads and/or opens an attachment of a simulated phishing message, forwards a simulated phishing message, replies to a simulated phishing message, or performs any other interaction with a simulated phishing message that is considered by phishing message interaction manager 205 to be a failure. Simulated phishing campaign manager 210 may be configured to deliver training to a user 102 that fails a simulated phishing test, for example using one or more training modules from training modules storage 209. Simulated phishing campaign manager 210, simulated phishing message generator 203, interaction identification manager 205, or virtual machine 204 may be an application, service, daemon, routine, or other executable logic for generating messages.

In examples, entity 101 may be a company, an organization, a university, a political party, or any other group of individuals that share common computer resources, for example a common domain name server, a common mail server, and so on. In examples, entity 101 may represent any subscriber to simulation system 200. Entity 101 may have one or more clients 102a . . . 102n. In some examples, client 102 may be associated with entity 101, for example, if entity 101 is a company, then client 102 may be an employee of the company. Entity 101 may be an organization that has an identity separate from that of its members, users, or clients 102. In embodiments, client 102 is a student at a university, or a member of a political party. Client 102 may be an employee, member, or independent contractor working for an organization that performs security checkups or conducts ongoing simulated phishing attacks to maintain security awareness. Client 102 may be referred to as user 102, client device 102, or user device 102. It is understood that user 102 interacts with entity 101, entity mail server 260, and simulation system 200 through a computing device, as described in Section A. Computing and Network Environment. Client 102 may be a target of any simulated or actual phishing attack. Entity 101 may comprise one or more networks, computers, servers or software, hosted onsite or offsite e.g., in a cloud, any combination of which may be used by entity 101 in providing capabilities, such as those required by a company or organization.

In some implementations, entity 101 comprises entity mail server 260. In some embodiments, entity mail server 260 may be configured to interact with entity SMTP manager 261 and entity POP3/IMAP protocol manager 262 to enable client 102 to send and receive messages from simulation system 200.

In some implementations, client 102 may include communications module 258, which may be a library, application programming interface (API), a set of scripts, or any other code that may facilitate communications between client 102 and any of server 106, simulation system 200, a third-party server, or any other server. In some embodiments, communications module 258 is configured to determine when to transmit information from client 102 to external servers via network 104, and to receive information from simulation system 200 via network 104. In some embodiments, information transmitted or received by communications module 258 may correspond to a message, such as an email, generated or received by messaging application 257. In some examples, client 102 may be configured to display received messages for the user using display 255 and accept user interaction via user interface 256 responsive to displayed simulated phishing messages.

Simulation system 200 may include simulation system mail server 280, which may be referred to as simulation system mail server 280 or simulation system mail client 280. In embodiments, simulation system mail server 280 contains simulation system email addresses storage 208, which may be configured to store one or more email addresses which are associated with the simulation system 200. Simulation system mail server 280 may include SMTP manager 281, which may also be referred to as SMTP server 281, which may be configured to send email messages over the internet between servers 106, simulation system 200 and one or more entities 101, which may be sent or may be received at entity mail server 260. In embodiments, simulation system mail server 280 may be hosted and maintained by a third party, which may for example be accessed by simulation system 200 over network 104. In embodiments, simulation system mail server 280 may be configured to communicate through a secure port, for example using a secure (SSL) connection as is known in the art. In some examples, simulated phishing message generator 203 can be configured to communicate generated simulated phishing messages to SMTP manager 281 to be sent to one or more users 102 of entity 101.

SMTP manager 281 may use other protocols other than SMTP, e.g., X.400 protocol or QMTP (Quick Mail Transfer Protocol) and may be referred to as X.400 manager 281 or QMTP manager 281. In implementations, as an alternative to SMTP, web-based email may be used, for example Gmail™ (Google, Inc, Mountain View, Calif.), MSN Hotmail (Microsoft, Redmond Wash.), and Yahoo! Mail (Yahoo, Sunnyvale, Calif.). Additional protocols for specifying recipients of messages and for sending and receiving messages are known in the art, and the current technology described herein may be extended to alternative protocols.

Simulation system mail server may include POP3/IMAP manager 282, which may be configured to receive incoming email to simulation system mail server 280, and to download incoming email from an email server hosted on cloud 108 over network 104. POP3/IMAP manager 282 may be an application, service, daemon, routine, or other executable logic for generating messages.

Simulation system 200 may be configured to include one or more entity simulation records 230, for example one entity simulation record for each unique entity. Entity simulation record 230 may include multiples storages for entity specific information, for example entity user attributes storage 211, which may be configured to store attributes and characteristic of users of entity 101 such as length of employment at the entity, personal identifiable information such as social security number, passport number, tax identification number, driver's license number, and any other information about users 102 of entity 101.

Simulation system 200 may include thread landing page manager 222. In embodiments, thread landing page manager 222 may be configured to create landing pages and associated hyperlinks for storage in landing page templates storage 207, such that simulated phishing message generator 203 may select a pre-stored landing page template when creating a reply email to the message thread that has been converted to a simulated phishing message (a converted reply simulated phishing message). In examples, hyperlinks may be associated with links in a converted reply simulated phishing message by simulated phishing message generator 203, that when clicked by user 102 will traverse user 102 to a landing page, for example a landing page from thread exploit landing pages storage 217 or landing page templates storage 207. In some examples, thread landing page manager 222 is configured to interact with thread conversion manager 220, for example to create landing pages associated with or modified to be suitable for a simulated phishing attack involving one or more converted reply simulated phishing messages. In embodiments, thread landing page manager 222 is configured to store one or more landing pages suitable for a simulated phishing attack using a message thread in thread exploit landing pages storage 217 for one or more entities. In embodiments, thread landing page manager 222 is configured to create a different version of a landing page suitable for a simulated phishing attack using a message thread for each entity 101a . . . 101n, to be stored in the thread exploit landing pages storage 217 associated with the corresponding entity's simulation record 230a . . . 230n. In examples, thread landing page manager 222 is configured to interact with training modules storage 209 and may be configured to incorporate one or more training modules from training modules storage 209 into one or more landing pages. Email templates storage 206, landing page templates storage 207, thread exploit landing pages storage 217 and training modules storage 209 may include, be, integrate with or couple to any type or form of storage, such as a database or file system coupled to memory 122. Thread conversion manager 220 and thread landing page manager 222 may be an application, service, daemon, routine, or other executable logic for generating messages.

In some implementations, user attributes stored in entity user attributes storage 211 may comprise data relating to the user, such as the user's contact information, first name, last name, e-mail address, position or role in an organization or in entity 101, risk score or any organizational metric, title, department, time zone, the name of their first line manager, the name of their second line manager, the name of their assistant, the name of their HR professional, other contact information, their social media contact information, their demographic information, or any other information about a user that can be stored. In embodiments, user attributes stored in entity user attributes storage 211 may include information about relationships that a user has, for example, information about teams or business units that the user belongs to, and information about other users in the team or business unit. In an embodiment, user attributes in entity user attributes storage 211 may include information about a location that the user is affiliated with and may include information about other users that are in the same location. In some examples, the user information stored in entity user attributes storage 211 may be analogous to user data stored in an active directory of entity 101. In embodiments, entity user attributes storage 211 may contain data input from client 102 via user interface 256 which may be configured to allow for user input through a non-graphical user interface, such as a user interface that accepts text or vocal input without displaying an interactive image.

User interface 256 may be for example, an application on a device that allows user 102 to interact with user messaging client 250 for the purposes of viewing and interacting with simulated phishing messages. In some examples, user interface 256 is part of messaging application 257. In implementations, user interface 256 is shown on display 255. A graphical user interface may be displayed on a screen of a mobile phone, or on a monitor connected to a desktop or laptop computer or may be displayed on any other display 255. A user may interact with e.g. the graphical user interface by typing, clicking a mouse, tapping, speaking, or any other method of interacting with user interface 256. The graphical user interface on the device may be a web-based user interface provided by a web browser (e.g. Google Chrome (Google Inc., Mountain View, Calif.), Microsoft Internet Explorer (Microsoft Corp., Redmond, Wash.), or Mozilla Firefox (Mozilla Foundation, Mountain View, Calif.)), or may be an application installed on user device 102 capable of opening a network connection over network 104 to simulation system 200, or may be any other type of interface.

In examples, entity simulation record 230 includes entity attributes storage 212, which may be configured to store attributes and characteristics of entity 101. In examples, entity simulation record 230 includes entity user simulation history storage 215, which may be configured to store records relating to current or past simulated phishing campaigns that user 102 of entity 101 has participated in or is participating in. Simulated phishing campaign manager 210 may be configured to read and write from entity user simulation history storage 215, for example to store user 102's results of a simulated phishing campaign. In examples, simulated phishing campaign manager 210 is configured to read records of entity user training history storage 216, for example to determine what types of simulated phishing attacks user 102 has be trained to recognize.

Entity 101 may include entity mail server 260. Entity mail server 260 may be configured to send and receive messages, for example email messages, using standard email protocols as are known in the art. In some examples, entity mail server 260 includes entity SMTP manager 261, which manages the protocols which send outgoing messages, and entity POP3/IMAP manager 262, which manages the protocols which receive incoming messages. Entity 101 may include user attributes storage 268, which may contain information about all users or clients 102 that are associated with entity 101. User attributes storage 268 may also be referred to as user record storage, user storage, client attributes storage, or client record storage.

Client 102 may include user messaging client 250. In embodiments, user messaging client 250 may be a web-based email client, for example Gmail™ (Google, Inc, Mountain View, Calif.) (Google, Mountain View, Calif.), MSN Hotmail (Microsoft, Redmond Wash.), and Yahoo! Mail (Yahoo, Sunnyvale, Calif.). In examples, if client 102 receives a message in user inbox 251 and believes that the message is a threat, client 102 may indicate the message is suspicious using thread reporting UI 253. Threat reporting manager 254, which may be configured receives the indication of the suspicious message from thread reporting UI 253, and to send the reported message to reported threat manager 224 at simulation server 200. In examples, reporting manager 254 may be configured to move a reported message from user inbox 251 to user deleted items 252.

Gaining Access to Message Threads

To generate a simulated phishing attack using message threads, simulation system 200 can gain access to message threads. In some embodiments, simulation system 200 may be configured to access entity mail server 260, and/or user messaging client 250 of user 102 for example to access user emails, which access may be facilitated by an entity 101 granting permissions to simulation system 200 and providing a method of connection between entity mail server 260 and simulation system 200. Simulation system 200 may be configured to allow entity 101 to grant access to entity mail server 260 and/or user messaging client 250 when the entity 101 established an account of simulation system 200. In some embodiments, entity 101 may be configured to grant access to simulation system 200 via a configurable parameter, for example accessible via a simulation system entity administrator interface 201. Access granted to simulation system 200 by entity 101 may be limited in scope. For example, entity 101 may specify which user messaging clients 250 are accessible, what type of messages are accessible, a time period that simulation system 200 may access user messaging clients 250 or entity mail server 260, or other specifics of the access granted.

The method of accessing a user's messaging client 250 is dependent on the messaging platform, e.g., Office365, Exchange, G-Suite etc. and the message protocols used. In examples, for example for POP3 and IMAP based platforms, entity 101 is configured to grant simulation system 200 access to user messaging client 250 of user 102 through sharing user specific credentials, for example user 102's username and passwords. In other messaging platforms, for example Microsoft MAPI (Microsoft, Redmond, Wash.) there is support for a "delegated inbox", enabling. simulation system 200 to be configured as a delegate of user messaging client 250, granting access to user 102's messaging client 250. In an example, simulation system 200 may be granted access user inbox 251, user deleted items 252, user archived items 259, and/or user sent items 291 of user messaging client 250.

In some examples, thread manager 225 may be configured to interact with entity email server 260 and/or user messaging client 250 through an application programming interface (API). The API used may vary across different entity mail servers 260 and user messaging clients 250. Example APIs used with email platforms are MAPI (Messaging Application Program Interface) and Microsoft Graph API (Microsoft, Redmond, Wash.), or Gmail API (Google, Mountain View, Calif.). In examples, communication access between simulation system 200 and entity 101 can be granted through an API using a verification process, for example an associated authentication method. In embodiments, authentication for simulation server 200 to access email client 250 or email server 260 of entity 101, and/or authentication for email server 260 or email client 250 to access simulation server 200, may be configured via API access granted through using an API key. Entity mail server 260 may be configured to provide simulation system 200 with a unique key enabling use of the API for all functions. In examples, entity email server 260 is configured to send an API key to simulation system 200 using Hypertext Transfer Protocol (HTTP), for example in the HTTP header, and/or API keys may be sent as part of the endpoint string. Entity email server 260 may be configured to create multiple keys for simulation system 200 and may be configured to revoke one or more keys at any time in the case of a security breach.

In embodiments, authentication for simulation server 200 to access email client 250 or email server 260 of entity 101, and/or authentication for email server 260 or email client 250 to access simulation server 200 via an API is granted through using OAuth 2.0 tokens using an existing account, such that simulation server 200 does not have to secure API keys. Entity 101 may be configured to enable API access for simulation server 200 during entity 101 account set up with simulation system 200, or for an established account using the account credentials, for example by using OAuth access and refresh tokens. In examples, an access token gives simulation system 200 the ability to access entity 101, while the refresh token lets simulation system 200 receive a new access token from entity 101 if the old one expires. In examples, entity mail server 260 is configured to send OAuth tokens to simulation system 200 using Hypertext Transfer Protocol (HTTP), for example in the HTTP header or in an endpoint string. In embodiments, an access token may be limited in scope, for example an access token can be granted for the entire entity email server 260 or may be granted for one or more user messaging client 250, or duration, for example the duration of validity of the OAuth token may be set to expire at some fixed time, may be set to expire periodically, or may be set to expire in relation to another event (for example the expiration of a simulated campaign).

In embodiments, authentication for simulation server 200 to access email client 250 or email server 260 of entity 101 or authentication for email server 260 or email client 250 to access simulation server 200 via an API is granted using JSON Web Tokens (JWT). JWT differ from OAuth tokens in that JWT can store any kind of data. In some examples, entity email server 260 is configured to provide details of simulation server 200 in the JWT that simulation server 200 will use when accessing entity email server 260 via an API, allowing entity email server 260 to identify simulation server 200 without a database lookup of the token or key. In some examples, simulation server 200 is configured to provide details of entity email server 260 in the JWT that entity email server 260 will use to access simulation server 200 over an API, allowing simulation server 200 to identify entity email server 260 without a database lookup of the token or key. In examples, JWT can also be used to include refresh tokens and expiry dates for API access, for example entity email server 260 or simulation server 200 may be configured to check the JWT signature with every API call to ensure the expiry date is in the future, and in examples the data field in the JWT may be used to indicate from the parameters to be used to determine the types of message threads simulation system 200 may use to generated a simulated phishing attack using an message thread, for example user names, user groups, etc.

In some examples, simulation system 200 is not configured to have access to entity mail server 260 and/or user messaging client 250. In embodiments, entity 101 may be configured to select one or more message threads to be used in a simulated phishing message using message threads. Identified message threads may be communicated to simulation system 200 using simulation system interface manager 264, for example using entity SMTP manager 261 for SMTP communications or using message transfer manager 290 for non-SMTP communications.

Identifying Message Threads Useful for Creating a Converted Reply Simulated Phishing Messages Once simulation system 200 has access to one or more message threads, simulation system 200 can identify a message thread to reply to, in order to create a converted reply simulated phishing message. Simulation system 200 may include simulation system administrator interface 202, which may be configured to enable an administrator of simulation system 200 to configure settings, parameters, users and user groups, and simulated phishing campaigns, for example a simulated phishing campaign using message threads. Simulation system 200 may include simulation system entity administrator interface 201, which may enable, for example, an administrator of entity 101 to configure parameters, users and user groups, and simulated phishing campaigns, for example a simulated phishing campaign using message threads. A system administrator of simulation system 200 or a system administrator of entity 101 may communicate with simulated phishing campaign manager 210, for example over network 104.

In examples, entity simulation record 230 includes thread selection parameters storage 213. In embodiments, thread selection parameters storage 213 is configured to store one or more rules or filters that may be used by simulation system 200 and/or entity 101 to select one or more message threads from a plurality of message threads to be used for simulated phishing attacks. Simulation system 200 may be configured to store thread selection parameters for entity 101 in thread selection parameters storage 213 as part of the entity simulation record 230. Entity 101 may be configured to store thread selection parameters in entity thread selection parameters storage 270. Thread selection parameters storage 213 and entity thread selection parameters storage 270 may contain none, some, or all the same thread selection parameters. Thread selection parameters in thread selection parameters storage 213 and entity thread selection parameters storage 270 may be added, updated, or removed. In examples, thread manager 225 is configured to communicate thread selection parameters, for example from thread selection parameters storage 213, to entity 101, for example to entity mail server 260. In examples, thread selection parameters received from simulation system 200 are stored in entity thread selection parameters storage 270.

Simulation system 200 and/or entity 101 may be configured to select message threads based on one or more thread selection parameters. In examples, message threads may be searched in the body of the message, the subject of the message, the header of the message, by recipients of the message, by senders of the message, by types of attachments, or by read/unread message status. In some examples, simulation system 200 and/or entity 101 may be configured to select a message thread which contains an organization name or organization domain in any part of the message, for example to see if one or more users 102 are susceptible to attacks which reference known vendors, or which include employees of known vendors in the address header. Simulation system 200 and/or entity 101 may be configured to select message threads based on one or more of the date of any of the messages of the message thread, the digital addresses (for example, email addresses) of one or more of the participants of the message thread, keywords, inclusion of links, inclusion of attachments, or number of participants in the message thread. In examples, simulation system 200 and/or entity 101 may identify participants of the message thread that are internal or external to entity 101, for example by examining the domain name of the digital address of the participant and may use this identification to select one or more message threads. Message thread selection criteria may consist of two or more thread selection parameters combined used Boolean logic operators, for example AND/OR, DOES/DOES NOT, etc. In embodiments, simulation system 200 is configured to provide or make available thread selection parameters to a simulation system or an entity administrator, which the administrator may select from to select one or more message threads.

Selection of message threads at either simulation system 200 and/or entity 101 may be automated, for example based on one or more thread selection parameters. In examples, simulation system 200 and/or entity 101 are configured to periodically select one or more message threads, and/or to select one or more message threads based on administrator or user input or interaction, and/or to search select one or more message threads when the number of identified message threads in identified message threads storage 269 at entity 101 and/or in message threads storage 214 at simulation system 200 falls below a certain number. In examples, simulation system 200 and/or entity 101 is/are configured to select one or more message threads based in response to a simulated phishing campaign being created, a simulated phishing campaign being completed, a message thread being required by simulation system 200 to create a simulated phishing message for a campaign, and so on.

In examples, simulation system 200 and/or entity 101 may be configured to select one or more message threads from one or more user messaging clients 250, for example from user inbox 251, user deleted items 252, user sent items 291 or user archived items 259. In examples, system administrator and/or entity administrator may select one or more user messaging clients 250 from which to select one or more message threads. The selection of user messaging clients 250 from which to select one or more message threads to be used in converted reply simulated phishing messages may be automated or based on one or more selection criteria. For example, a user messaging client 250 may be identified based the users risk score, the frequency with which the user corresponds with individuals external to entity 101, attributes of the user, the user failing a simulated phishing campaign, and/or based on any criteria used to create one or more groups of users, or based on any criteria used individually or in combination.

Entity simulation record 230 may include message thread storage 214. In examples, message thread storage 214 may be configured to store message threads which have been received from entity 101 for use in simulated phishing attacks. Simulation system 200 may include thread conversion manager 220. In examples thread conversion manager 220 may be configured to select one or more message threads from message thread storage 214, and to convert the message thread into a converted reply simulated phishing message. In some examples, message thread storage 214 may be configured to store received message threads from entity 101 which either have or have not been converted into a converted reply simulated phishing message. Entity simulation record 230 may include thread exploit landing pages storage 217, which may be configured to storage web pages that a user will traverse to if the user fails a simulated phishing attack, for example by interacting with a link in the simulated phishing message or an attachment of the simulated phishing message. In examples, entity server access manager 283 is configured to identify message threads according any of the methods previously described.

In implementations, entity server access manager 283 may be configured to manage simulation system 200 access to user messaging client 250. In examples, entity server access manager 283 is configured to communicate with user messaging client 250, for example via an API, to select message threads, for example message threads found in user inbox 251, user deleted items 252, user archived items 259, and/or user sent items 291. In embodiments, identified message threads are moved to identified message threads storage 269 in entity mail server 260, for example by message thread selection manager 263. Copies of one or more identified message threads may be stored in identified message threads storage 269 in entity mail server 260. Entity mail server 260 may be configured to send one or more identified message threads, for example from identified message threads storage 269, to simulation system mail server 280. In some embodiments, thread manager 225 is configured to generate one or more requests for simulation system interface manager 264 to communicate identified message threads from entity mail server 260 to simulation system 200.

Receiving Identified Message Threads at the Simulation System

In embodiments, identified message threads are received at simulation system 200. If simulation system 200 cannot access user email client 250 to identify email threads, entity mail server 260 may be configured to send one or more message threads to simulation system 200. In embodiments, message threads are pulled to simulation system 200 through a receiving protocol instead of being sent to simulation system 200 using SMTP from the client side, such that headers of the message thread stay intact. In examples, simulation system 200 may be configured to use one or more simulation system email addresses 208, secure ftp sites, secure online workspaces or portals, etc. that entity mail serve8 260 can send or upload one or more message threads to. Simulation system 200 may be configured to provide a unique simulation system email address 208 for each entity 101.

Simulation system 200 may include thread manager 225, configured in examples to manage message threads associated with entity 101 and which may be stored in message thread storage 214. In some examples, thread recipient manager 221 is configured to receive message threads associated with one or more entities 101. Thread recipient manager 221 may be configured to store received message threads in message thread storage 214, for example using entity interface manager 218. In examples, message threads from entity 101 are received by reported threat manager 224, for example responsive to user 102 of entity 101 indicating using threat reporting UI 253 that the message seems suspicious. In embodiments, thread manager 225 is configured to interact with entity mail server 260 of entity 101. Thread manager 225, thread recipient manager 221, reported threat manager 224 and threat reporting UI 253 may be an application, service, daemon, routine, or other executable logic for generating messages.

Reported threat manager 224 at simulation system 200 may be configured to review and/or to select reported messages suitable for creating a simulated phishing attack using message threads and may be configured to forward suitable message threads to thread manager 225 and/or to store suitable message threads in message thread storage 214. Reported threat manager 224 may be configured to select reported emails that have multiple participants, message threads which contain hyperlinks and/or which include attachments, message threads with a call to action or with urgency, and/or message threads with other triggers that would encourage a recipient of the email to react to it.

In embodiments, entity 101 may be configured to give credentials to simulation server 200 to include in requests for message threads, for example message threads from one or more user messaging clients 250. In an example, credentials from entity 101 for a user messaging client 250 are included in a converted reply simulated phishing message sent to that user messaging client 250. In embodiments, credentials are included in an X-header in the converted reply simulated phishing message.

In examples, a user may sign into a Gmail™ (Google, Inc, Mountain View, Calif.) account to access their email, or may sign into Office 365, using their established credentials such as username and password. User authentication manager 267 may be configured to authenticate the user based on established user credentials and create a JSON Web Token (JWT). In embodiments, entity mail server 260 may be configured to encapsulate the user's JWT in a message to simulation server 200 via the Gmail API, or in an HTTP header. In examples, simulation server 200 may be configured to include the user's JWT in a request to entity mail server 260 for a message thread on which the user is a participant. Entity email server 260 may be configured to verify the authenticity of the request based on the received JWT, and to process the request by selecting an identified message thread from identified message threads storage 269 on which the user is a participant, and to communicate the identified message thread to simulation server 200 using the Gmail API.

In examples, simulation server 200 may configured to request via a message sent to entity 101 that simulation server 200 be made a delegate of user 102, thereby granting simulation server 200 access to emails in user 102's inbox 251, user 102's deleted items 252, user 102's sent items 291, and/or user 102's archived items. In implementations, simulation server 200 may be configured to use email retrieval protocols to obtain message threads from user messaging client 250. Email retrieval protocols include SMTP, POP3 or IMAP email protocols, and other protocols as known in the art. Entity SMTP manager 261 may be configured to forward, transfer, or copy a message thread to a simulation system email address, which may be received by POP3/IMAP manager 282 in simulation system mail server 280. Simulation system 200 may allocate simulation system email addresses to entity 101 as part of account establishment, based on a request from entity 101, or at other times before, during, or after a simulated phishing campaign.

In examples, an administrator of entity 101 may forward, transfer or copy a message thread to simulation system mail server 280. In embodiments, message transfer manager 290 is configured to insert a copy of headers of the original message thread message into the body of the forwarded, transferred or copied message before the message is sent to the simulation system mail server 280 by entity SMTP manager 261. In embodiments, message transfer manager 290 is configured to include the original message thread message as an attachment, for example as a MIME attachment (message/rfc822) of the forwarded, transferred or copied message before the message is sent to simulation system mail server 280 by entity SMTP manager 261. In embodiments, message transfer manager 290 is configured to create a new email message addressed to a simulation system email address and to copy the message thread including message thread headers into the new email message before the message is sent to the simulation system mail server 280 by entity SMTP manager 261. Message transfer manager 290 may be configured to create a new email message addressed to a simulation system email address and may include the original message thread message as an attachment to the new email message before the new email message is sent to simulation system mail server 280 by entity SMTP manager 261. Entity mail server 260 may be configured to access user sent items 291 in user messaging client 250 and select a message thread to be re-sent. Entity mail server 260 may be configured to edit the recipients of the message to be re-sent in order to remove all existing recipients and to add a simulation system email address to the message before the message is sent to simulation system mail server 280 by entity SMTP manager 261.

Creating a Converted Reply Simulated Phishing Message Using a Message Thread

Simulation system 200 may be configured to convert an email thread to include any known exploit techniques. In examples, simulation system 200 may create an application or plug in accessible by an administrator, enabling the administrator to create a converted reply simulated phishing message to an email thread. In examples, an administrator may select a message thread, for example from message threads storage 214, and may select multiple options for converting the message thread to a converted reply simulated phishing message, for example changing existing links to training links, adding training links, changing an attachment to include links and/or training content, adding an attachment, and/or any other known exploit technique that may be included in a converted reply simulated phishing message.

In examples, thread conversion manager 220 is configured to store message threads in message thread storage 214. Simulated phishing message generator 203 may be configured to create a simulated phishing message as a reply message to a message thread, also referred to as a converted reply simulated phishing message. Thread conversion manager 220 may be configured to interact with simulated phishing campaign manager 210, for example to provide simulated phishing message generator 203 with a converted message thread to use in a simulated phishing campaign. Thread conversion manager 220 may be configured to create a converted reply simulated phishing message template from a converted message thread, which may be stored in phishing message templates 206.

In examples, simulation system 200 may be configured to create a reply message in the email thread which encourages or directs a target user to perform an unsafe action. Simulation system 200 may be configured to create a forwarding message of the email thread which encourages or directs a target user to perform an unsafe action.

Simulated phishing campaign manager 210 may be configurable to interact with phishing message templates storage 206, for example to retrieve a template useful for creating a converted reply to a message thread. In examples, simulated phishing message generator 203 is configurable to create a converted reply simulated phishing message to a message thread from identified message thread storage 214.

In examples, simulated phishing message generator 203 may be configured to generate message templates, for example templates for replies to message threads or templates that are copies of message threads that can be used as content for converted reply simulated phishing messages and which may be stored in phishing message templates storage 206. Simulated phishing message generator 203 may be integrated with memory 122 to provide simulated phishing message generator 203 access to parameters associated with messaging choices made for a particular simulated attack by e.g., simulated phishing campaign manager 210.

In some examples, simulated phishing message generator 203 may be configured to interact with SMTP manager 281, for example to provide SMTP manager 281 with a converted reply simulated phishing message thread to be sent to one or more target users. Simulated phishing message generator 203 may be configurable to create a converted reply simulated phishing message that is a copy of a message thread from identified message threads storage 214 with added training links or attachments, from training modules storage 209. In embodiments, training modules are added to the converted reply simulated phishing message by simulation system 200. In embodiments, training modules accessed via a landed page linked to from the converted reply simulated phishing message thread are added by an administrator of simulation system 200 or of entity 101.

In some embodiments, simulated phishing message generator 203 is configured to add indicators to the converted reply simulated phishing message that user 102 should recognize as signs that the message should not be trusted. For example, simulated phishing message generator 203 may add spelling or grammar mistakes, may add unrealistic threats or demands, may request the user provide sensitive information, may add a mismatched or suspicious URL, and so on.

Selecting One or More Targets of a Converted Reply Simulated Phishing Message to a Message Thread Senders and recipients on a message thread may be referred to as participants of, or participants in the message thread. In embodiments, simulation system 200 is configured to create one or more converted reply simulated phishing messages using one or more message threads. User 102 that is an intended recipient of a converted reply simulated phishing message, for example a user that is to be tested with the converted reply simulated phishing message, may be referred to as target user. A target user may be a participant of a message thread selected for creating a converted reply simulated phishing message to the message thread. In examples, an email address of a target user is included in one of the address fields of a converted reply. Participants on a message thread which are not target users for the converted reply may be referred to as non-recipient users. In examples, each participant in a message thread which has been converted to be used as a converted reply are classified as either a target user or a non-recipient user. In examples, participants in a message thread which are not clients 102 of entity 101 are non-recipient users of a converted reply simulated phishing message to the message thread.

User 102 may be selected to be a target user or a non-recipient user of a converted reply according to multiple criteria, for example user 102's risk score, groups that user 102 is allocated to, user 102's relationship with other participants of the message thread that the converted reply is based upon, other user attributes, for example attributes stored in entity user attributes storage 211, user 102's simulation history, records of which may be stored in entity user simulation history storage 215, user 102's training history, records of which may be stored in entity user training history storage 216, or attributes of entity 101, such as may be stored in entity attributes storage 212. Simulation system 200, or entity 101 may be configured to select one or more target users to test with the converted reply. A system administrator may create a group of target users of a converted reply, for example a group of users that are associated with an ongoing simulated phishing campaign may be selected as target users for a converted reply simulated phishing message to a message thread. In some examples, the user that has the highest risk score may be chosen as the target user. Target users of a converted reply may be chosen as all participants on the message thread that have a risk score over a threshold. In some examples, all participants on a message thread are target users of a converted reply.

In embodiments, a participant of an email thread may be selected to be a target user of a converted reply based on criteria, such as the user's risk score, groups the user is allocated to or a member of, and/or the relationship the user has with other participants of the email thread. A target user of a converted reply simulated phishing message to a message thread may or may not be a participant on the message thread. An administrator of simulation system 200 or of entity 101 may create a group of users to be targets of a converted reply, or users that are members of an existing group of users may be targets of a converted reply simulated phishing message to a message thread. In examples, the converted reply message appears to be from a participant on the message thread from who is a non-recipient user of the converted reply simulated phishing message.

Sending a Converted Reply Simulated Phishing Message to a Message Thread to One or More Target Users and Zero or More Non-Recipient Users In some embodiments, SMTP manager 281 is configured to interact with simulated phishing campaign manager 210, and simulated phishing campaign manager 210 is configured to coordinate and inform SMTP manager 281 as to when to send a converted reply simulated phishing message to a message thread. SMTP manager 281 may be configured to communicate with other SMTP servers to deliver the converted reply simulated phishing message to one or more clients 102 who is a target user and to zero or more non-recipient users. SMTP manager 281 may be configured to take the email address of the one or more target users of the converted reply simulated phishing message (e.g., <recipient_user@entity_domain.com>", and divides it into a target username (what is before the @ symbol) and a domain name (what is after the @ symbol). In some examples, SMTP manager 281 is configured to communicate with a domain name server (DNS) to determine the IP address for the domain name. In embodiments, the SMTP server then delivers the message to entity POP3/IMAP manager 262.

Simulated phishing message generator 203 may be configured to populate an address field in a converted reply simulated phishing message thread with the display name and email address of one or more target users and/or one or more non-recipient users, as in some examples the converted reply simulated phishing message may seem more believable to the one or more target users if the message is, or appears to be, sent to more recipients than just a target user.

In examples, a display name may be shown on the header of the message, and the email address associated with the display name is the correct email address for one or more non-recipient users. In examples, if a target user of the converted reply simulated phishing message hovers over, clicks on, or otherwise interacts with the display name of a non-recipient user that is shown on the header of the converted reply simulated phishing message, the target user will see the correct email address of the non-recipient user, which will reinforce the belief that the message is genuine, in some cases causing the target user to overlook other parts of the message which are indicators that the message is not genuine. In this way, the converted reply simulated phishing message that is received by a target user appears to the target user to have been sent to the one or more non-recipient users that are shown in the header of the message, whether or not the converted reply simulated phishing message was in fact sent to one or more non-recipient users.

In examples, entity email server 260 may be configured to authorize simulation system 200 to create, modify and send emails from one or more user messaging clients 250. Simulated phishing campaign manager 210 may be configured to send the converted reply simulated phishing message from the user messaging client 250 of a non-recipient user on the message thread. In some examples, simulated phishing campaign manager 210 may be configured to make it appear that a converted reply message is sent from the user messaging client 250 of one of the participants on the message thread, while the converted reply simulated phishing message is actually sent by simulated phishing campaign manager 210.

In embodiments, simulated phishing campaign manager 210 may be configured to use direct message injection to send a converted reply to one or more target user inboxes 251 and zero or more non-recipient users inboxes 251. In embodiments, one or more message headers, for example a header identifying the sent message as a converted reply simulated phishing message, are added before the message is directly injected into the one or more users' inboxes 251. In other examples, one or more message headers are added when the converted reply simulated phishing message is directly injected into one or more users' inboxes 251.

Simulated phishing campaign manager 210 may send the converted reply simulated phishing message to the one or more target users, for example via simulation system mail server 280, however simulated phishing campaign manager may explicitly specify the sender's address where the sender of the e-mail ("Return-Path", "X-Sender", "Reply-To") and its author ("From") are different e-mail addresses:

Smtp mailer=new Smtp( );
//Use SMTP relay with authentication.
//Note that we authenticate as sender@simserver.com, not as target user@entity.com
mailer.SmtpServers.Add("mail sim server.com", "sender@simserver.com", "secret");
//Set From address (author of the e-mail).
mailer.Message.From.AsString="target_user <target_user@entity.com>";
//Set body and other headers.
mailer.Message.To.AsString="Jane Doe <jane@entity.com>";
mailer.Message.Subject="Items for sale";
mailer.Message.BodyPlainText="2 new items in stock";
//Send from sender@simserver.com.
mailer.Send("sender@simserver.com", (string)null);

Mitigating Unwanted Organizational Impact of Sending a Converted Reply Simulated Phishing Message to a Message Thread with More Than One Participant Sending a converted reply simulated phishing message to one or more non-recipient users that are participants in the message thread that the converted reply is based on may cause harm, confusion, or even chaos within an organization. In examples, techniques may be employed to mitigate unwanted organizational impact, for example by preventing converted reply simulated phishing messages from being sent to, or delivered to, message thread participants that are not a target user of the converted reply.

In embodiments, thread conversion manager 220 is configured to associate a simulation system email address with a display name for a non-recipient user. The display name of the non-recipient user may be shown on the address header of the converted reply, however the email address associated with the display name is not a correct email address for the non-recipient user that is represented by or associated with the display name. In some examples, the email address associated with the display name is a simulation system email address. In some examples, simulation system email addresses are designed to be associated with an email domain of simulation system 200.

In an embodiment, simulated phishing message generator 203 may be configured to mimic the email addresses of non-recipient users in the address header, for example using realistic variants of non-recipient users' email addresses that a target user may fail to spot, for example non-recipient_user_@entity.com instead of non-recipient_user@entity.com.

A display name for a non-recipient user may be shown on the address header of the converted reply simulated phishing message to the message thread, and the email address associated with the display name is a correct email address for the non-recipient user. Simulated phishing message generator 203 may be configured to not send the converted reply simulated phishing message to the non-recipient users that are included in the address header. In an example, simulated phishing message generator 203 may be configured to include only one or more target users in the address header of the converted reply message in the RCPT TO: command, so SMTP manager 281 will only send the converted reply simulated phishing message to the one or more target users, and not to non-recipient user(s).

An example SMTP flow for not sending a converted reply simulated phishing message to user messaging client 250 of the one or more non-recipient users is as follows. Lines prefixed with ← are received from a simulation system 200 server (psm.simserver.com); lines prefixed with → are sent to a server((mx.google.com)):

←220 mx.google.com ESMTP 133si4170893edb.147—gsmtp
→HELO psm.simserver.com
←250 mx.google.com at your service
→MAIL FROM:<dc618da377a6415aafeeeab737592bd5@psm.simserver.com>
←250 2.1.0 OK 133si4170893edb.147—gsmtp
→RCPT TO:target_user@entity.com [the email is only sent to the target user]
←250 2.1.5 OK 133si4170893edb.147—gsmtp
→DATA
←354 Go ahead 133si4170893edb.147—gsmtp
→From: Your Bank <fd25d7cb8b39456c98196c9d913e68d2@training.simserver.com>
→Date: Mon, 11 Feb. 2019 20:35:14 GMT
→To: <target user@entity.com>, <non-recipient_user@entity.com>
→CC: <non-recipient_user2@entity.com>
→Subject: Wire Transfer →Content-Type: text/html
→
→<html><body>
→Please     <a     href="https://training.simserver.com/ fd25d7cb8b39456c98f96c9d913e68d2">click   here</a> confirm incoming wire transfer.
→</body></html>
→.
←250 2.0.0 OK 1549918046133si4170893edb.147—gsmtp The converted reply simulated phishing message may be sent to only the one or more target users using the RCPT TO: command as shown above, however the one or more target users may "reply all" to the simulated phishing email thread, which could send the email thread to all users in the address header. The one or more target users may "forward" the converted reply simulated phishing message, which could send the converted reply simulated phishing message to other users 102 of entity 101, or even to users that are not associated with entity 101. In examples, entity mail server 260 is configured to intercept any converted reply simulated phishing messages that are sent by a target to another user, for example by the target user using the "reply all" or "forward" commands. Entity mail server 260's server-side filter may be configured to intercept the messages from a target user.

In embodiments, simulated phishing message generator 203 may be configured to move non-recipient users of the converted reply simulated phishing message to the bcc: address field, such that if a target user replies to the converted reply simulated phishing message, the reply message would not go to the non-recipient users.

If one or more target user responds to the converted reply simulated phishing message (either by replying to all or by forwarding) and adds a new user to the message that was not a participant on the message thread, simulated phishing campaign manager 210 may be configured to add the new user as a target user for the converted reply simulated phishing message.

In embodiments, simulated phishing message generator 203 may remove all non-recipient users from the converted reply simulated phishing message, for example by removing the names/email addresses of non-recipient users from the generated simulated phishing email. Simulated phishing message generator 203 may generate the converted reply simulated phishing message to include a reason why other participants of the message thread are removed from the thread, for example by adding text to the body of the message indicating "I have removed [names of participants from this message thread", or "Moving [names of participants] to bcc:".

In embodiments, the display name associated with a simulation system email address in the email address/display name pair may be the name of a participant in the message thread or the name of another user 102 of entity 101. In examples, the display name associated with a simulation system email address in the email address/display name pair may be the name of a person that may or may not have a direct relationship with the target user but nonetheless is someone that the target user would recognize or know of.

In embodiments, simulated phishing message generator 203 is configured to add text to the body of a converted reply simulated phishing message intended to discourage the target user from contacting a non-recipient user involved with the thread, for example by starting a new message thread to the non-recipient user, calling the non-recipient user, or using another means of communication to contact the non-recipient user. For example, simulated phishing message generator 203 may include an "out of office" message to discourage a target user from trying to reach a non-recipient user.

In an embodiment, simulated phishing message generator 203 may be configured to add a header to the converted reply simulated phishing message, for example an X-header as is known in the art, which indicates that the converted reply simulated phishing message is only to be delivered to the one or more target users. Entity POP3/IMAP manager 262 may be configured to monitor for converted reply simulated phishing messages with the X-header, and when such a message is identified, entity mail server 260 only delivers the simulated phishing message to the one or more target users.

Target User Actions to the Converted Reply Simulated Phishing Message to a Message Thread There are several modes of failure of the simulated phishing test when a target user interacts with the converted reply simulated phishing message. The following non-limiting list includes some examples of target user failures that interaction identification manager 205 may be configured to identify.

a. A target user might open or download a simulated malicious attachment that was added to the converted reply simulated phishing message by simulated phishing message generator 203.

b. A target user might open or download an existing attachment that was made "malicious" in the converting process by thread conversion manager 220.

c. A target user may reply to or forward the converted reply simulated phishing message.

d. A target user may contact a participant in the simulated phishing email using a communication that is distinct from the converted reply simulated phishing message, for example a target user may call a participant in the simulated phishing email on the phone to ask a question or discuss content of the email thread.

The following non-limiting list includes some examples of consequences or actions that take place responsive to interaction identification manager 205 identifying an interaction with the converted reply simulated phishing message by a target user.

a. Entity mail server 260 may intercept any reply or forwarding of the converted reply simulated phishing message, for example using a mail filter, to prevent the converted reply simulated phishing message from being sent on.

b. Entity mail server 260 or simulated phishing campaign manager 210 may remove all other participants on the email thread using one of the methods described in this disclosure.

c. Entity mail server 260 may intercept any replied to or forwarded converted reply simulated phishing messages only when the message is to be sent to a user that is not a user of entity 101.

d. Simulated phishing campaign manager 210 may add users of entity 101 to which the message is to be sent as a result of the message being replied to or forwarded, as additional target users of the converted reply simulated phishing message.

e. Simulation server 200 may install a plug in for user messaging client 250 that is configured to create a pop up for the target user indicating that they have failed a simulated phishing test.

f. Simulation server 200 may record that the target user has failed the simulated phishing test but may not indicate this to the target user until at least one recipient of the simulated phishing email reports the converted reply simulated phishing message as a potential malicious message There are several modes of passing the simulated phishing test when a target user receives the converted reply simulated phishing message. A non-limiting list of some examples of target user successes that interaction identification manager 205 may identify include the following.

a. The target user may identify the converted reply simulated phishing message as a potential threat and may report the email by interacting with threat reporting UI 253 or by forwarding the converted reply simulated phishing message to a security administrator of entity 101.
b. The target user may do nothing with the converted reply simulated phishing message (i.e. ignore it) or may deleted the simulated phishing message.
c. The target user may label the converted reply simulated phishing message as "junk" or "spam" using user messaging client 250.
d. The target user may call an administrator of entity 101 to report the converted reply simulated phishing message.

When there is a failure where a target user interacts with an element of the simulated phishing email, for example the target user clicks on a link in the simulated phishing email, training may be delivered to the target by simulation server 200. An administrator of simulation system may review other target user responses to determine whether they are failures and may designate failures at their discretion. Actions a target user takes may affect risk scores or other reporting.

In some embodiments, response to one or more actions that a target user takes in response to receiving a converted reply simulated phishing message may determine one or more follow on actions. For example, if a target user fails the simulated phishing test, the target user may be traversed to a landing page and may be required to engage in security awareness training. If a target user fails the simulated phishing test, the risk score of the target user may change to indicate that the target user is a higher risk than previously. If a target user successfully passes the simulated phishing test, the risk score of the target user may change to indicate that the target user is a lower risk than previously.

In embodiments, identification manager 205 is configured to interpret that a target user has been tricked by the converted reply simulated phishing message. Interaction identification manager 205 may interact with simulated phishing campaign manager 210, for example in response to target user interaction with the converted reply simulated phishing message. In examples, interaction identification manager 205 may deliver a training module from training modules storage 209 to target user via network 104 in response to the target user interacting with the converted reply simulated phishing message. In examples, training modules storage 209 may comprise links, videos, electronic documents, slideshows, or any type or means, of relaying training content to a target user (for example client 102).

Figure 3:
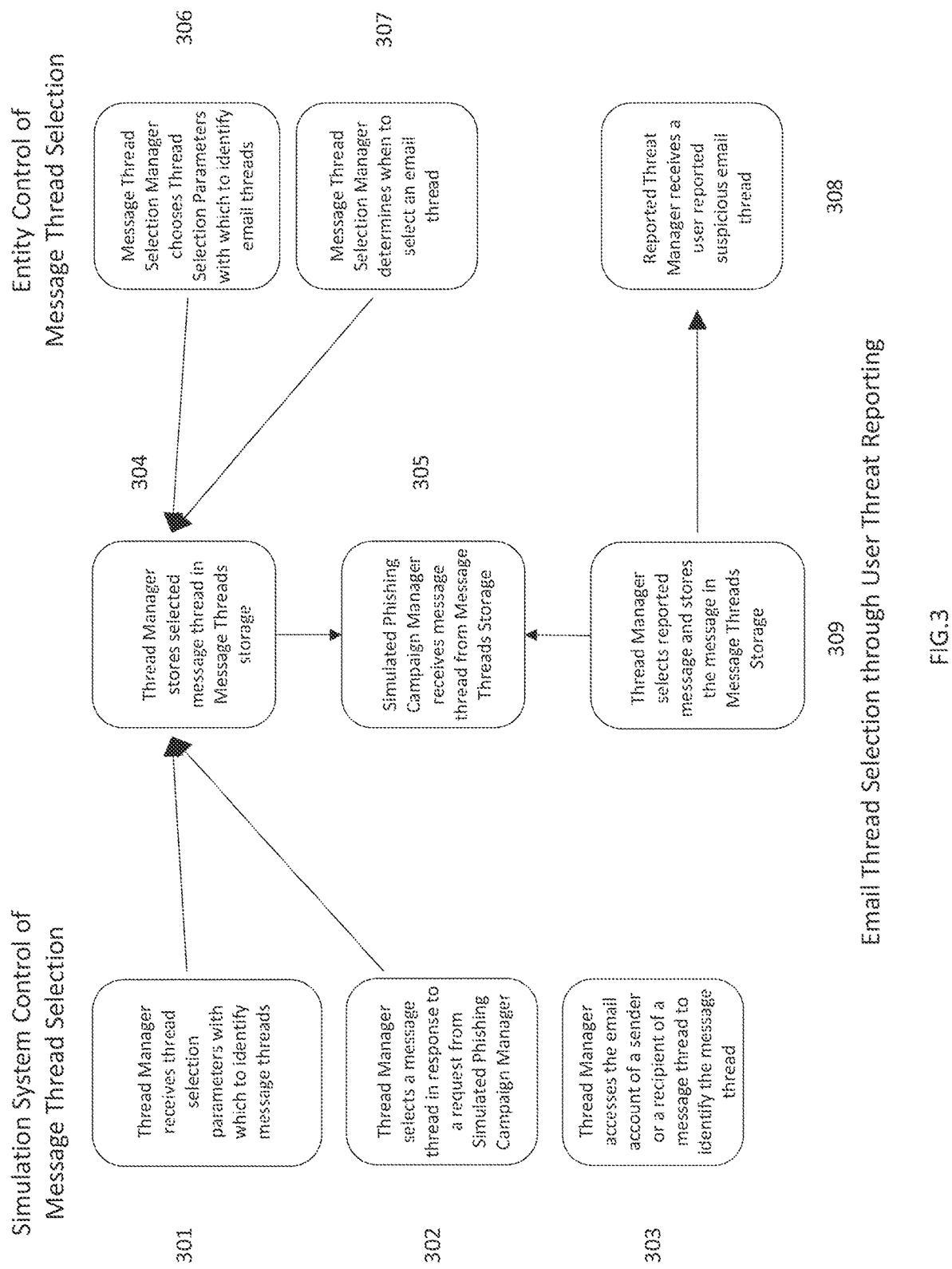
FIG. 3 depicts examples of methods of selection of message threads that are useful for simulating a phishing attack. Examples of simulation system control, entity control, or user threat reporting control of email thread selection methods are depicted.

FIG. 3 illustrates examples of ways in which a message thread may be selected. In some examples, simulation system 200 takes actions to select message threads. In other examples, entity 101 takes actions to select message threads. Message thread selection may also be enabled through user threat reporting.

Referring to FIG. 3 in more detail, in 301, thread selection parameters may be used to search different parts of messages, for example a message may be searched in the body of the message, the subject of the message, one or more headers of the message, or an attachment to the message. Thread selection parameters may also be used to select messages based on characteristics of the message, for example by read/unread message status, by location that the message thread was selected from (for example, user inbox 251, user deleted items 252, user archived items 259, or user sent items), by the number of participants in the email message, by the presence of one or more participants that are not employees of entity 101, and so on. In some examples, simulation system 200 has control of message thread selection.

Thread selection parameters may change over time and may be added or deleted to the thread selection parameter storages 213 and 270. In some examples, thread selection parameters may be associated with a simulated phishing campaign. Thread selection parameters may be entity specific, user group specific, or user specific. Thread selection parameters may be associated with entity location and/or entity time zone, or at any other granularity.

Thread manager 225 may be configured to select a message thread which contains an organization name or organization domain in any part of the message. A reply converted message to such a method thread may be used to identify one or more users 102 that are susceptible to attacks which reference known vendors, or which include employees of known vendors in the address header. Thread manager 225 may be configured to select message threads based on one or more of the date of any of the messages of the message thread, the digital addresses (for example, email addresses) of one or more of the participants of the message thread, keywords, inclusion of links, inclusion of attachments, or number of participants in the message thread. In examples, simulation system 200 and/or entity 101 may identify participants of the message thread that are internal or external to entity 101, for example by examining the domain name of the digital address of the participant, to select one or more message threads. Message thread selection criteria may consist of two or more thread selection parameters combined used Boolean logic operators, for example AND/OR, DOES/DOES NOT, etc. In embodiments, simulation system 200 is configured to provide or make available multiple potential thread selection parameters to a simulation system or an entity administrator, enabling the administrator to select one or more thread selection parameters to apply when searching message threads.

In example 301, thread manager 225 receives thread selection parameters to use in selecting message threads. The thread selection parameters may be retrieved by thread manager 225 from an entity simulation record 230, for example from thread selection parameters storage 213. In examples, thread selection parameters may be retrieved from entity 101, for example message thread selection manager 263 may send parameters from entity thread selection parameters storage 270 and may send them to simulation system 200. An administrator may configure the thread selection parameters through a user interface to simulation system 200 or entity 101.

In 302, thread manager 225 may select a message thread in response to a request from simulated phishing campaign manager 210. In an example, when a simulated phishing campaign is being configured, simulated phishing campaign manager 210 may request message threads to use for creating converted reply simulated phishing messages, and may include a parameter indicating the group of users that are part of the campaign such that the message threads selected include one or more of the users in the group of users. In another example, simulated phishing campaign manager may request message threads which include the words "human resources" in any part of the message or attachment, for use in a simulated phishing campaign involving simulated messages incorporating human resources calls to action.

In 303, thread manager 225 may access a user messaging client 250, for example an email account, of user 102 in order to select message threads from any of the user inbox 251, the user deleted items 252, the user archived items 259, the user sent items 291, or any other folder or repository of user messages. In examples, a message with relevant thread search parameters may be sent from simulation system 200 to entity mail server 260, for example using an API with JWT. In examples, simulation system 200 sends a control message to entity mail server 260, for example using HTTP headers and HTTP protocols, wherein the message contains thread selection parameters for entity mail server 260 to use in selecting message threads. The message threads selected by entity mail server 260 under direction of thread manager 225 may be sent to simulation system 200 using an API, or the selected messages may be attached to an email from entity mail server 260 to simulation system mail server 280. Other methods of sending the selected messages using standard email protocols may be used, with entity mail server 260 ensuring that the address header of the selected message is sent to thread manager 225 without modification. In examples, entity mail server 260 may forward the message after copying the address header information into the body of the selected message, or after adding an attachment to the message with the address header information.

Thread selection parameters storage 213 of entity simulation record 230 may contain all the thread selection parameters that pertain to a given entity. In some embodiments, an administrator communicates thread selection parameters to thread manager 225, using simulation system administrator interface 202 if the administrator is associated with the simulation system or using simulation system entity administrator interface 201 if the administrator is associated with the entity.

Once thread manager 225 has one or more selected message threads, in 304 the selected threads may be stored in message thread storage 214. In examples where the thread selection was initiated responsive to a request from simulated phishing campaign manager 210, thread manager may communicate an address or a pointer into message thread storage 214 to simulated phishing campaign manager 210, such that the campaign manager knows where to go to in message threads storage 214 to find message threads that were selected based on the request. In 305, simulated phishing campaign manager receives message threads from message threads storage 214, for example to use in a simulated phishing campaign. In examples, thread manager 225 transfers message threads from message threads storage 214 to simulated phishing campaign manager 210 responsive to receiving details related to the simulated phishing campaign, for example the theme, the one or more target users or target user groups of the campaign, the start date of the campaign, and other characteristics as specified by simulated phishing campaign manager 210.

In 306, the choice of thread selection parameters for identifying message threads is controlled by message thread selection manager 263 of entity 101. Message thread selection manager may use thread selection parameters, for example thread selection parameters stored in entity thread selection parameters storage 270. Thread selection manager 263 may choose selection parameters based on attributes of users of entity 101, as may be stored in user attributes storage 268, for example to ensure that converted reply simulated phishing messages generated for a simulated phishing campaign for users of entity 101 has characteristics that are relevant to users of entity 101. In 307, message thread selection manager 263 determines when to select one or more email threads. In an implementation, example 307 may include an administrator choosing a time to select an email thread and communicating that time to thread selection manager 263 using simulation system administrator interface 202 or simulation system entity administrator interface 201.

In 308, a user of entity 101 receives an email that the user believes to be a threat, and the user reports this message to entity 101 using threat reporting UI 253. Thread reporting manager 254 of user messaging client 250 may look for reported messages that are part of a message thread. Threat reporting manager 254 may filter the reported messages according to threat selection parameters as previously described, for example using selection parameters from entity thread selection parameters storage 270. Threat reporting manager 254 may send identified message threads to simulation system 200, via any of the methods to send messages between entity 101 and simulation 200 as previously described. Reported threat manager 224 of simulation system 200 receives user reported suspicious email threads. In examples, simulation system 101 takes steps to ensure that the received user reported suspicious email thread is not a malicious message.

In 309, thread manager 225 selects one or more message threads from the received user reported suspicious message threads, for example using thread selection parameters as previous described. Thread manager 225 may store selection message threads in message threads storage 214, which may subsequently be received by simulated phishing campaign manager 305 for use in a simulated phishing campaign using message threads.

Figure 4:
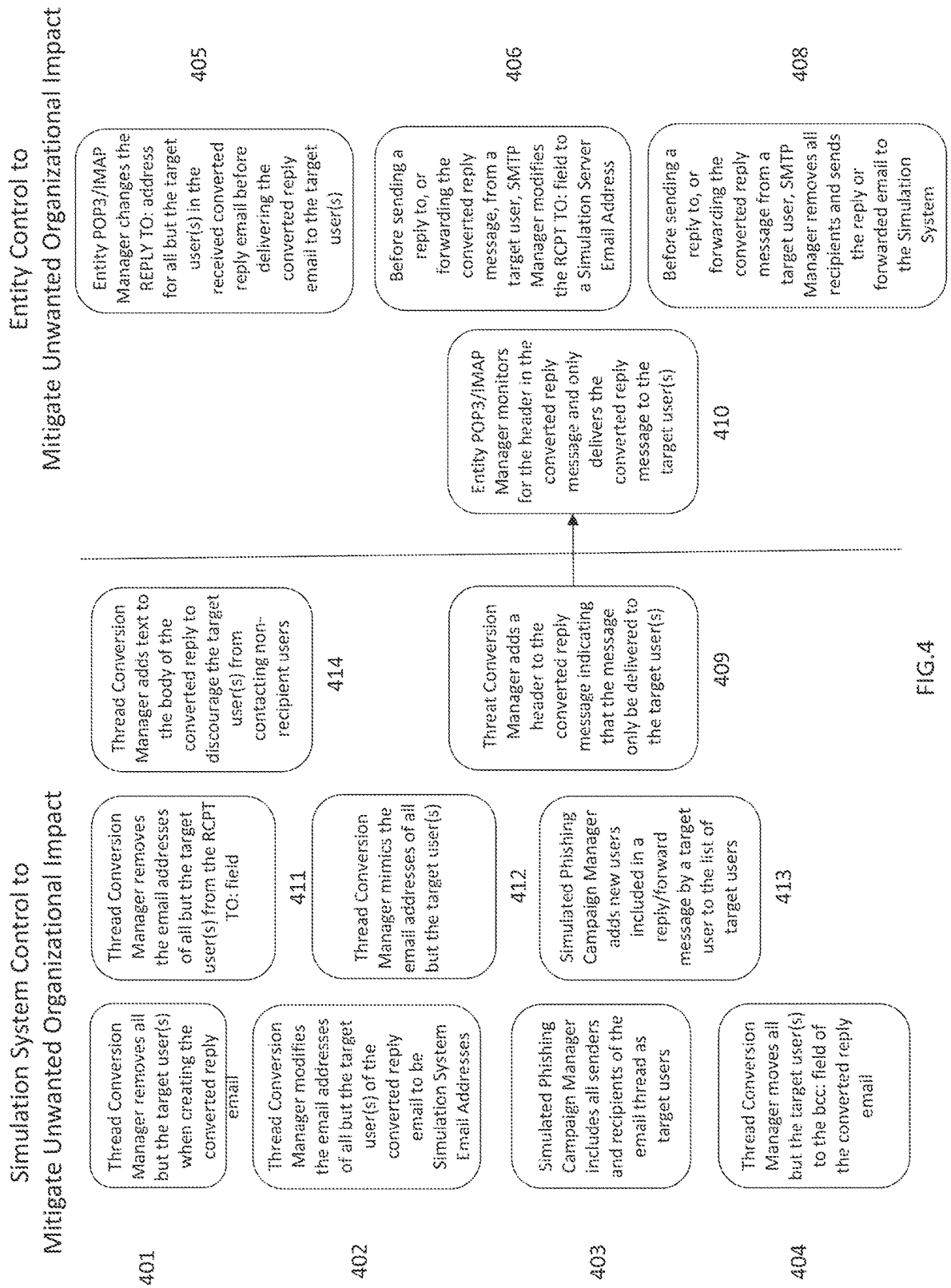
FIG. 4 depicts examples of methods for mitigating unwanted organizational impact of a simulated phishing attack involving message threads. Examples of simulation system control, entity control, or use of out of band signaling methods are depicted.

Referring to FIG. 4 in a general overview, FIG. 4 illustrates examples of simulation system control to mitigate unwanted organizational impact, examples of entity control to mitigate unwanted organizational impact, and an example of out of band signaling to mitigate organizational impact, for example as may be caused by a target user replying to all participants on the email thread, or forwarding a converted reply simulated phishing message. FIG. 4 illustrates a non-exhaustive selection of ways to mitigate unwanted organizational impact caused by a simulated phishing campaign using message threads.

In example 401, when creating the converted reply from the message thread, thread conversion manager 220 may remove all message thread participants except for the target user(s), i.e., remove the non-recipient users from the converted reply message. In example 402, instead of removing the non-recipient users from the converted reply message, thread conversion manager 220 modifies the email addresses of the non-recipient users, replacing the correct non-recipient user email address with a simulation system email address. When viewing the message address header, a user would see the names of the non-recipient users however if the user were to click on or hover over the non-recipient user's name, they would be shown an email address that is not that of the non-recipient user.

In example 403, simulated phishing campaign manager 210 classifies all the participants on the message thread as target users. In embodiments, simulated phishing campaign manager 210 may add the participants classified as target users to the simulated phishing campaign that the converted reply message will be used for. Simulated phishing campaign manager 210 may create a new user group including all the participants of the message thread. In examples, simulated phishing campaign manager 210 may create a new simulated phishing campaign for the new user group which includes all the participants of the message thread as target users.

In example 404, when creating the converted reply simulated phishing message, thread conversion manager 220 moves all the participants on the message that are not target users to the bcc: field of the address header. In this way, if one or more target user replies or forwards the converted reply message, the non-recipient users will not be included on the reply or forwarded message.

In example 411, thread conversion manager leaves all the participants in the converted reply simulated phishing message address header in the same configuration as the original message thread, and only includes the one or more target users in the RCPT TO: field of the SMTP header of the converted reply simulated phishing message. In this way, it will appear to a target user receiving the converted reply simulated phishing message that all the original participants are on the message, when in fact all the participants who are not target users did not receive the converted reply simulated phishing message.

In example 412, thread conversion manager 220 leaves all the participants in the converted reply simulated phishing message address header in the same configuration as the original message thread, however the email addresses of the non-recipient users are altered such that the email address looks very similar to the correct email address and a target user may overlook the difference. For example, if the correct email address for non-recipient user "Jane Doe" is ane.doe@entity.com>, thread conversion manager 220 may replace the correct email address for Jane Doe with a mimicked email address, for example jane_doe@entity.com>. In examples, the mimicked email addresses are included in the simulation system email addresses, and as such any reply or forward of the converted reply simulated phishing message by a target user would be delivered to the simulation system mail server 280 instead of to the non-recipient user(s).

In example 413, if a target user replies or forwards the converted reply simulated phishing email, the simulated phishing campaign manager 413 adds the participant of the replied to or forwarded email as a target user of the simulated phishing test. In examples, if one of the participants in the replied to or forwarded email is a user who is not part of entity 101, entity mail server 260 may remove the user who is not part of entity 101 from the replied to or forwarded converted reply simulated phishing message before the message is sent by entity SMTP manager 261, for example by using a message filter which strips all participants with a domain name different from the domain name of entity 101 from the replied to or forwarded converted reply simulated phishing message.

In example 414, thread conversion manager 220 adds text to the body of the converted reply simulated phishing message to discourage the one or more target users from contacting the non-recipient users, for example using a method of communication not related to the message thread. For example, thread conversion manager 220 may add text which implies that a non-recipient user is going to be out of the office and unreachable for the next two weeks.

In examples, entity 101 takes actions to mitigate unwanted organization impact of a simulated phishing message using message threads. In example 405, responsive to receiving the converted reply simulated phishing message, entity POP3/IMAP manager 262 changes the addresses of any non-recipient users included in the SMTP REPLY TO: command to simulation system email addresses or removes non-recipient users from the SMTP REPLY TO: field altogether. The address header of the converted reply simulated phishing message delivered to the user messaging client 250 of a target user looks identical to other messages of the message thread, however if the target user replies to the converted reply simulated phishing message, the reply will not go to the non-recipient users. Similarly, in example 406, responsive to receiving a reply or forwarding of the converted reply simulated phishing message from a target user, entity SMTP manager 261 changes the SMTP RCPT TO: field and removes the addresses of any non-recipient users, and the reply or forward of the converted reply simulated phishing message will not go to the non-recipient users. In example 408, instead of removing only the non-recipient users from the SMTP RCPT TO: command, the entity SMTP manager 261 removes all participants from the SMTP RCPT TO: command and adds a simulation system email address to the SMTP RCPT TO: command, such that the replied or forwarded converted reply simulated phishing message is delivered to simulation system 200.

In example 409, thread conversion manager 220 adds a header, for example an X-header, to the converted reply simulated phishing message. The X-header is used as an out-of-band signaling channel between simulation system 200 and entity mail server 260. Threat conversion manager 200 may send a message to entity mail server 260 indicated that entity mail server 260 should only deliver the converted reply simulated phishing message to the one or more target users. In example 410, entity POP3/IMAP manager 262 monitors incoming messages for the X-header added by simulation system 200. Responsive to receiving a message with this X-header, entity POP3/IMAP manager 262 modifies the SMTP RCPT TO: field of the received message by removing all non-recipient users from the SMTP RCPT TO: command, with the result that the message is not delivered to the user messaging client 250 of the non-recipient users.

Figure 5:
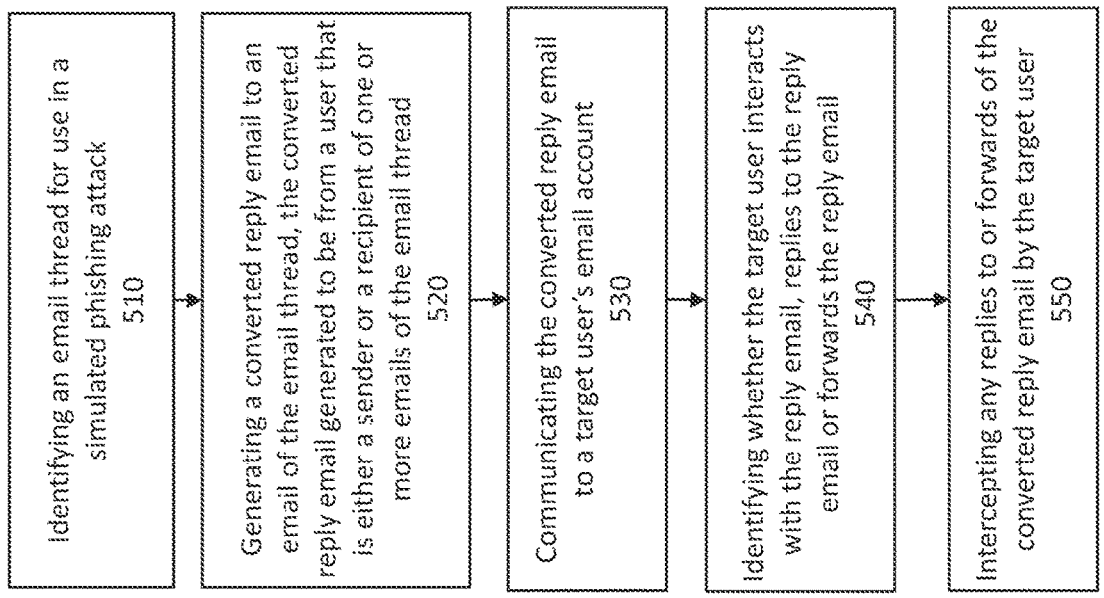
FIG. 5 depicts an example of a method for performing a simulated attack involving a message thread. Identification of a thread suitable for performing an attack, generation of a converted reply mail from the selected thread and sending of the converted reply mail.

FIG. 5 describes an example of a method performed by simulation system 200 to create a simulated phishing attack using a message thread. At step 510 of method 500, simulated phishing campaign manager identifies an email thread for use in a simulated phishing attack, for example by employing one or more of the message selection techniques previously described. The email thread may be identified by entity 101 or by simulation system 200. In implementations, the identified email thread is identified as a result of a user reporting the email thread as suspicious, using thread reporting UI 253. In examples, identified threads are stored in identified message threads storage 269 or in message threads storage 214. Step 520 includes generating a converted reply email to the identified email thread wherein the converted reply email generated by thread conversion manager 220 is created to be sent by a user that is a participant on the email thread, i.e., that is either a sender or a recipient of one or more emails of the email thread and that is not a target user. In implementations, step 530 includes communication of the converted reply email, for example by SMTP manager 281 to a target user account in user inbox 251. In examples, the converted reply email may be directly injected into user inbox 251 of the target user. In embodiments, step 540 includes simulation system 200 identifying whether the target user interacts with the reply mail using interaction identification manager 205. In examples, interactions include the target user reporting the converted reply mail or deletion of the converted reply mail using thread reporting UI 253, sending it to user deleted items 252 or user archived items 259. Step 540 may include simulation system 200 identifying whether the target user replies to or forwards the converted reply email using interaction identification manager 205. Step 550 of method 500 may include entity mail server 260 implementing server-side rules or a server-side filter configured to intercept a reply to or forwarding of a converted reply email from the target user. In examples, implementation of server-side rules or server-side filters are applied in response to simulation system 200 identifying whether the target user replied to or forwarded the converted response email. In embodiments, implementation of server-side rules or server-side filters are consistently implemented by entity mail server 260 and are not only implemented in response to identification of whether the target user replies to or forwards the converted reply email.

Figure 6:
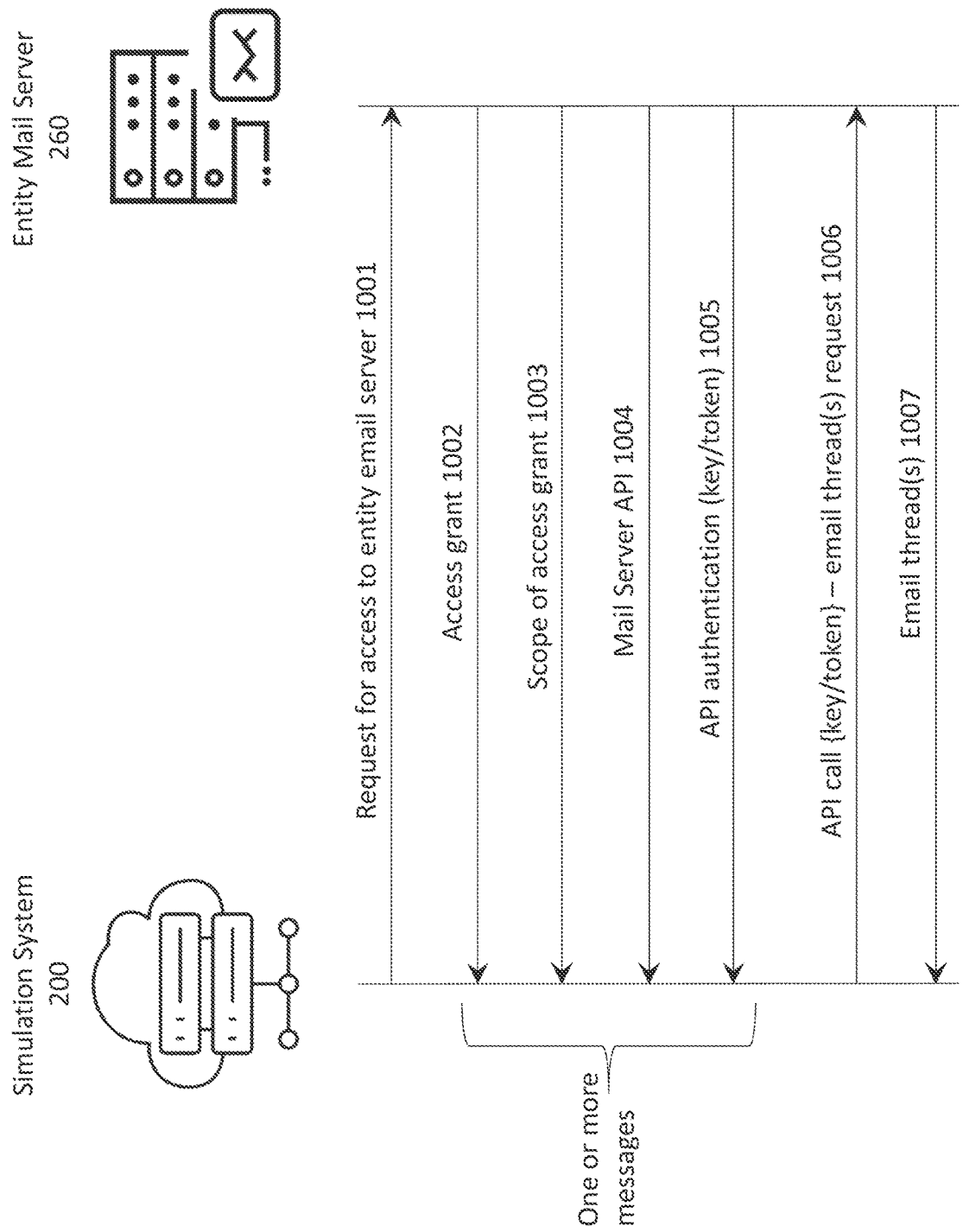
FIG. 6 depicts an example of a method to use APIs to enable a simulation system to receive message threads from an entity email server.

FIG. 6 describes an example of a method for entity mail server 260 to grant access to simulation system 200 using APIs and API authentication. At step 1001, simulation system 200 sends a request for access to entity email server 260. The request may be made using an API of entity email server 260. In examples, simulation system 200 may send the request in an email sent to entity mail server 260. Simulation system 200 may encode the request in the header of an email sent to entity mail server 260, for example using an X-Header. At step 1002, entity mail server grants simulation system 200 API access to entity email server 260. Scope limitations of the access grant may be sent at step 1003. For example, the access grant may limit the access of simulation system 200 to a fixed time period, or to a duration of a simulated phishing campaign. The access grant may be restricted to user message clients 250 of a single user, or a group of users. Restrictions may be described for any characteristic of a message, for example simulation system 200 may not be granted access to messages that include a specific user of entity 101, for example the CEO of entity 101.

In examples where the access request from simulation system 200 to entity mail server 260 was not made using an API, at step 1004, entity mail server 260 may send information identifying the entity mail server API to simulation system 200. At step 1005, entity email server 260 may provide authentication information to simulation system 200, such that simulation system 200 may include the authentication information when using the API to entity email server 260, which may enable entity email server 260 to know that simulation system 200 has been granted access without have to look up simulation system 200 in a database. In examples, API authentication uses API keys as previously described. In examples, API authentication makes use of API tokens, in a manner previously described. API authentication using JWT may also be used.

In examples, one or more of access grant 1002, scope of access grant 1003, mail server API 1004, or API authentication key/token message 1005 may be omitted. The messages 1002, 1003, 1004 and 1005 may be combined into a single message from entity mail server 260 to simulation system 200 or may be sent in two or more messages.

At step 1006, simulation system 200 makes an API call to entity mail server 260 requesting identified email threads. The API call may include the key or token issued to simulation system 200 with the access grant and may include thread selection parameters that entity mail server 260 may use when identifying email threads. At step 1007, entity mail server 260 uses the API to send selected email threads to simulation system 200.

Figure 7:
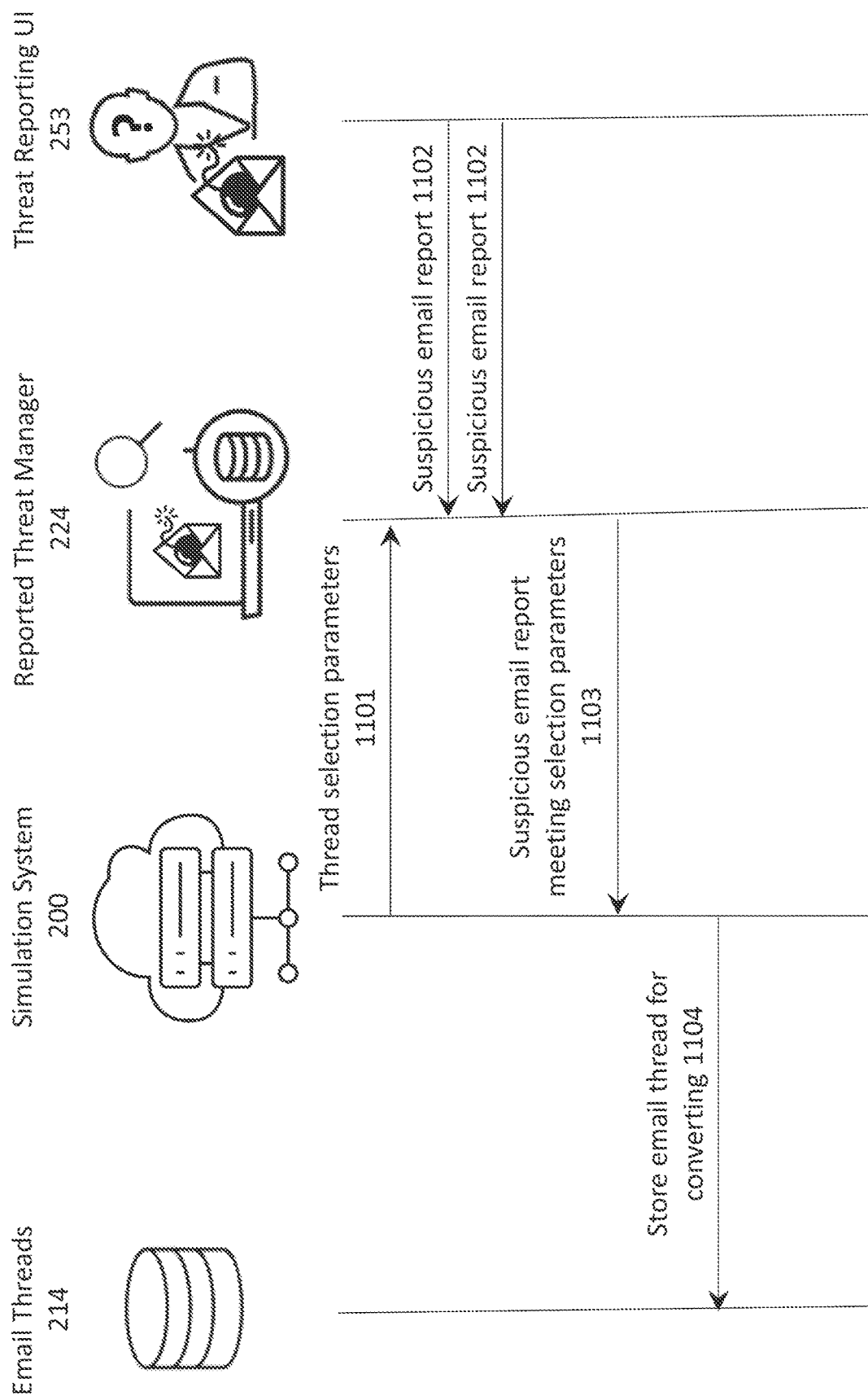
FIG. 7 depicts an example of a method to use a threat reporting user interface to receive message threads from an entity email server.

FIG. 7 describes an example of a method for receiving email threads at a simulation system through a user threat reporting UI. At step 1101, simulation system 200 sends thread selection parameters to entity 101, which in some examples may be shared with reported threat manager 224, for example by storing and retrieving the thread selection parameters from thread selection parameters storage 213. User messaging client 250 may include thread reporting UI 253. In some embodiments, thread reporting UI 253 is an element in the user interface of the email client, for example thread reporting UI 253 may be a button on the user message client user interface 256 which user 102 can interact with to report a suspicious message. At step 1102, user 102 of entity 101 may interact with thread reporting UI 253 when user 102 receives a message in user inbox 251 that the user believes to be suspicious. Responsive to the user reaction to the perceived suspicious message, threat reporting UI 253 sends the suspicious email report to reported threat manager 224. In examples, the reported mail is moved to user deleted items 252.

At step 1103, responsive to the reported suspicious email fulfilling message thread selection parameters, the reported email is sent to simulation system 200. In embodiments, the reported email is sent to simulation system 200 without identification of thread selection parameters in the reported email.

At step 1104, simulation system 200 may store the email thread in email threads storage 214. In examples, simulation system 200 will store email threads in email threads storage 214 only if simulation system 200 has determined that the email thread is not a genuine threat. Simulation system may use thread selection parameters to determine if the reported email thread should be stored in email threads storage 214. In examples, the email thread is only stored if it meets one, some, or all the thread selection parameters identified by simulation system 200. In examples, the threat selection parameters applied may be specific to a simulated phishing campaign, to a group of users, or to a specific user.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
identifying, by a simulation system executing on one or more processors and configured to interface via an application programming interface (API) with an email system of an entity, one or more parameters configured in the simulation system for selecting an email thread from a plurality of email threads of the email system of the entity to target a simulated phishing email;
selecting, by the simulation system via the API with the email system of the entity, the email thread from the plurality of email threads from the email system based at least on the one or more parameters; and
converting, by the simulation system, an email of the email thread from the email system into a reply simulated phishing email from a user that is one of a recipient or a sender of one or more emails of the email thread.

2. The method of claim 1, further comprising providing, by the simulation system, the converted reply simulated phishing email to an email account of a target user.

3. The method of claim 1, further comprising communicating, by the simulation system, the reply simulated phishing email to one of another recipient or sender of one or more emails of the email thread.

4. The method of claim 1, further comprising accessing, by the simulation system, the email system to identify the plurality of email threads.

5. The method of claim 1, further comprising receiving, by the simulation system, identification of the plurality of email threads from the email system.

6. The method of claim 1, wherein converting the email of the email thread into the reply simulated phishing email comprises generating from the user's email account the reply simulated phishing email.

7. The method of claim 1, further comprising converting the email of the email thread into the reply simulated phishing email to display a correct name of the user but use a different email address for routing any replies communicated responsive to replying to the reply simulated phishing email.

8. The method of claim 1, wherein the one or more parameters comprises one or more attributes of one of an entity of the user or one or more users participating in the email thread.

9. The method of claim 1, wherein the one or more parameters comprises a subject matter of one or more emails of the email thread or an attachment to the one or more emails.

10. The method of claim 1, wherein the one or more parameters comprises one or more characteristics of one or more emails.

11. A system comprising:
a simulation system on one or more processors, coupled to memory and configured to configured to interface via an application programming interface (API) with an email system of an entity, the simulation system configured to:
identify one or more parameters configured in the simulation system for selecting an email thread from a plurality of email threads of the email system of the entity to target a simulated phishing email;
select, via the API with the email system of the entity, the email thread from the plurality of email threads from the email system based at least on the one or more parameters; and
convert an email from the email system of the email thread into a reply simulated phishing email from a user that is one of a recipient or a sender of one or more emails of the email thread.

12. The system of claim 11, wherein the simulation system is further configured to provide the converted reply simulated phishing email in an email account of a target user.

13. The system of claim 11, wherein the simulation system is further configured to communicate the reply simulated phishing email to one of another recipient or sender of one or more emails of the email thread.

14. The system of claim 11, wherein the simulation system is further configured to access the email system to identify the plurality of email threads.

15. The system of claim 11, wherein the simulation system is further configured to receive identification of the plurality of email threads from the email system.

16. The system of claim 11, wherein the simulation system is further configured to convert the email of the email thread into the reply simulated phishing email by generating from the user's email account the reply simulated phishing email.

17. The system of claim 11, wherein the simulation system is further configured to convert the email of the email thread into the reply simulated phishing email to display a correct name of the user but use a different email address for routing any replies communicated responsive to replying to the reply simulated phishing email.

18. The system of claim 11, wherein the one or more parameters comprises one or more attributes of one of an entity of the user or one or more users participating in the email thread.

19. The system of claim 11, wherein the one or more parameters comprises a subject matter of one or more emails of the email thread or an attachment to the one or more emails.

20. The system of claim 11, wherein the one or more parameters comprises one or more characteristics of one or more emails.

* * * * *